(12) United States Patent
Park

(10) Patent No.: US 9,996,249 B2
(45) Date of Patent: Jun. 12, 2018

(54) MOBILE TERMINAL AND METHOD OF CONTROLLING THE MOBILE TERMINAL

(71) Applicant: LG ELECTRONICS INC., Seoul (KR)

(72) Inventor: Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 14/186,971

(22) Filed: Feb. 21, 2014

(65) Prior Publication Data
US 2014/0372938 A1    Dec. 18, 2014

(30) Foreign Application Priority Data

Jun. 14, 2013 (KR) .................. 10-2013-0068657

(51) Int. Cl.
*G06F 3/0488*    (2013.01)

(52) U.S. Cl.
CPC .. G06F 3/0488 (2013.01); *G06F 2203/04804* (2013.01)

(58) Field of Classification Search
CPC ........ G06F 2203/04804; G06F 3/0481; G06F 3/04842; G06F 3/0488
USPC ........................................... 715/793
See application file for complete search history.

(56) References Cited

U.S. PATENT DOCUMENTS

| | | | | |
|---|---|---|---|---|
| 2002/0171682 A1* | 11/2002 | Frank | ................. | H04N 1/00411 715/772 |
| 2006/0061597 A1 | 3/2006 | Hui | | |
| 2007/0124503 A1* | 5/2007 | Ramos | ................. | G06F 3/017 709/248 |
| 2008/0163082 A1* | 7/2008 | Rytivaara | ............. | G06F 1/1626 715/762 |
| 2008/0174564 A1* | 7/2008 | Kim | ..................... | G06F 3/0488 345/173 |
| 2008/0270950 A1* | 10/2008 | Whitehead | .......... | G06F 3/04883 715/863 |
| 2009/0160785 A1 | 6/2009 | Chen et al. | | |
| 2010/0122194 A1* | 5/2010 | Rogers | ............... | G06F 3/04817 715/769 |
| 2010/0323762 A1 | 12/2010 | Sindhu | | |
| 2011/0107212 A1 | 5/2011 | Jeong | | |
| 2011/0282906 A1* | 11/2011 | Wong | ............... | G06F 17/30831 707/780 |
| 2013/0227456 A1* | 8/2013 | Lee | .................... | G06F 17/30265 715/769 |

(Continued)

FOREIGN PATENT DOCUMENTS

| | | |
|---|---|---|
| CN | 101226444 A | 7/2008 |
| CN | 101606121 A | 12/2009 |
| CN | 102203711 A | 9/2011 |

(Continued)

*Primary Examiner* — Roland J Casillas
(74) *Attorney, Agent, or Firm* — Birch, Stewart, Kolasch & Birch, LLP

(57) ABSTRACT

A mobile terminal including a wireless communication unit configured to perform wireless communication; a display unit configured to display a first screen layer including first screen information; and a controller configured to display a second screen layer including second screen information such that at least part of the first and second screen layers overlap, and activate one of the first and second screen layers for receiving a touch input.

10 Claims, 35 Drawing Sheets

(56) References Cited

U.S. PATENT DOCUMENTS

2014/0337730 A1* 11/2014 King ................. G06F 17/30058
715/716

FOREIGN PATENT DOCUMENTS

| CN | 102822790 A | 12/2012 |
|---|---|---|
| EP | 1947557 A1 | 7/2008 |
| EP | 2393267 A1 | 12/2011 |
| WO | WO 2007/133206 A1 | 11/2007 |
| WO | WO 2008/081303 A2 | 7/2008 |
| WO | WO 2011/121171 A1 | 10/2011 |

* cited by examiner

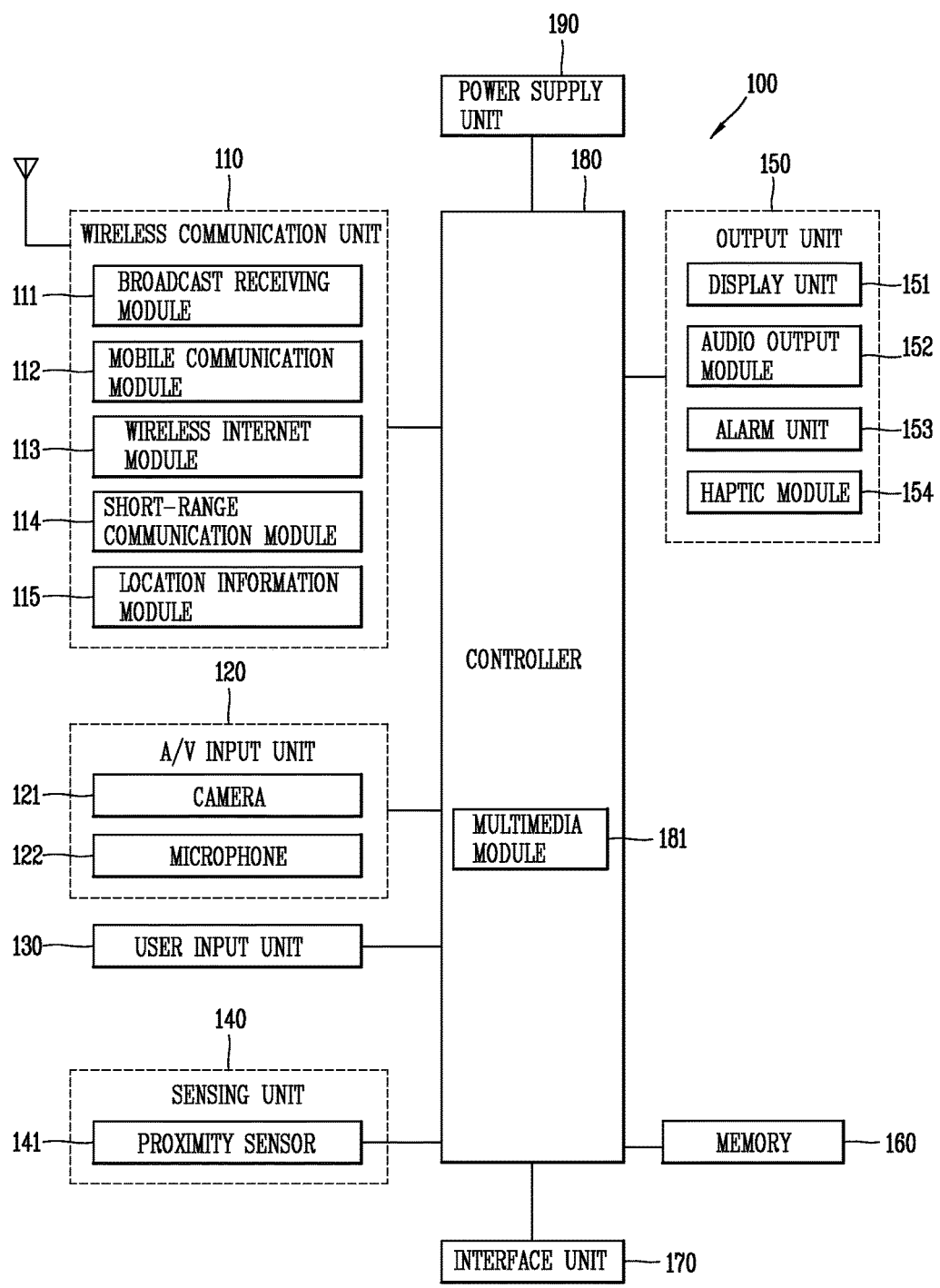

FIG. 5B
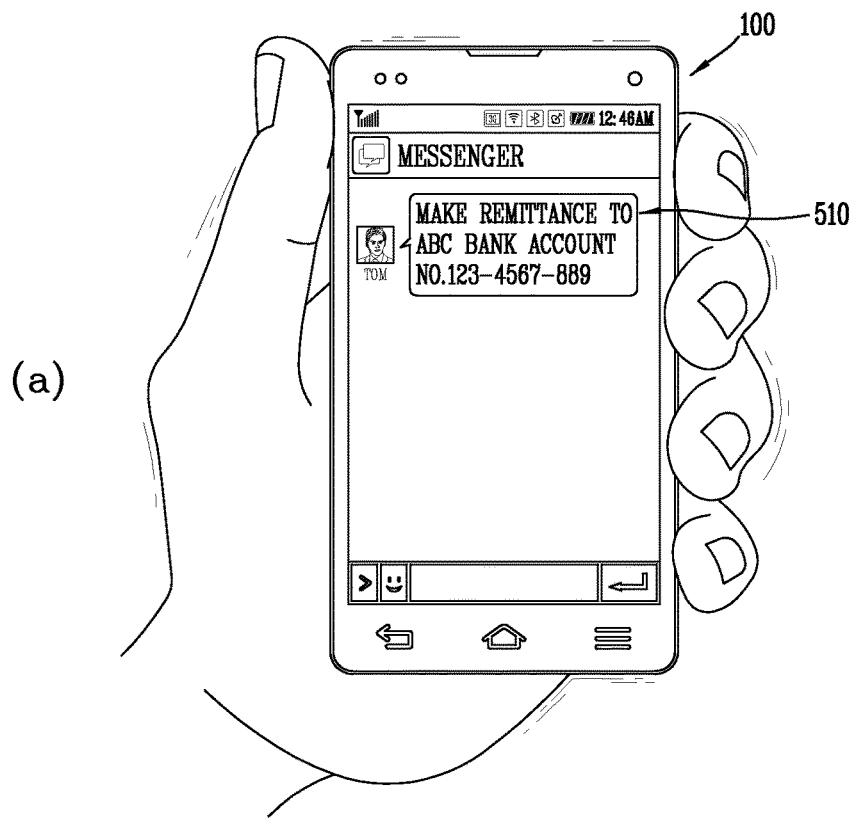
(a)
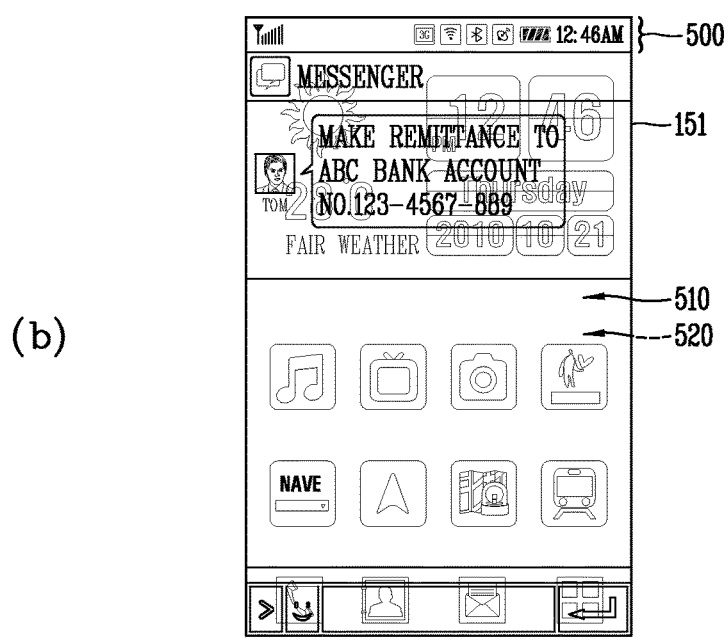
(b)

FIG. 5F
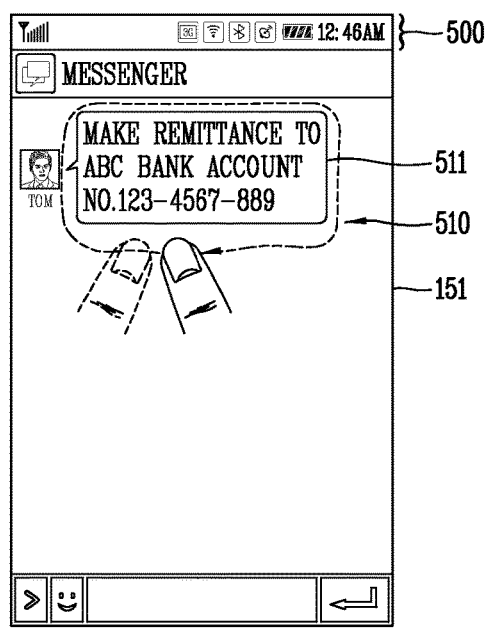
(a)
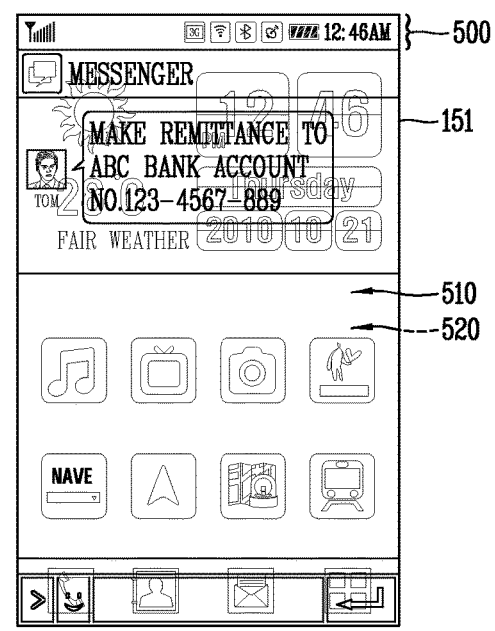
(b)

FIG. 6A
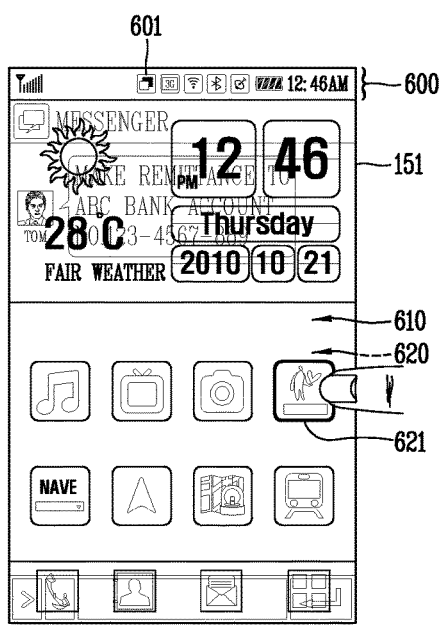
(a)
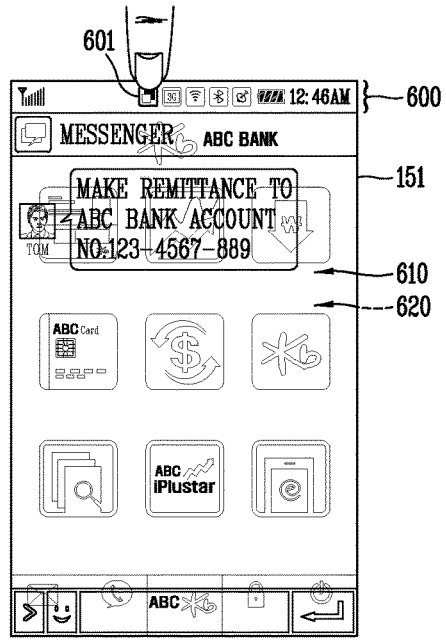
(b)
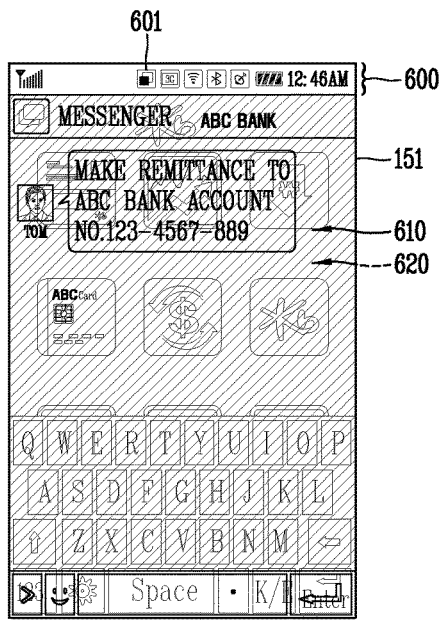
(d)
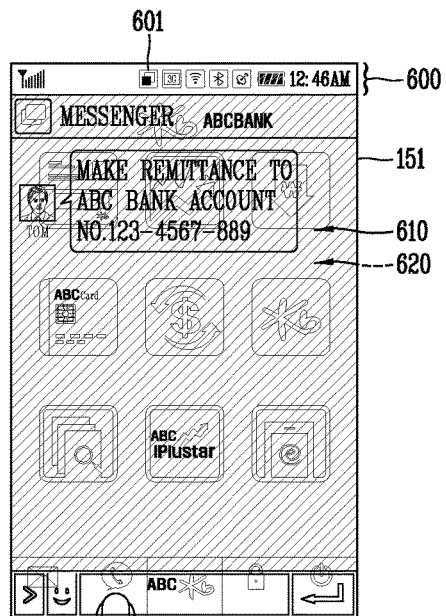
(c)

FIG. 9A
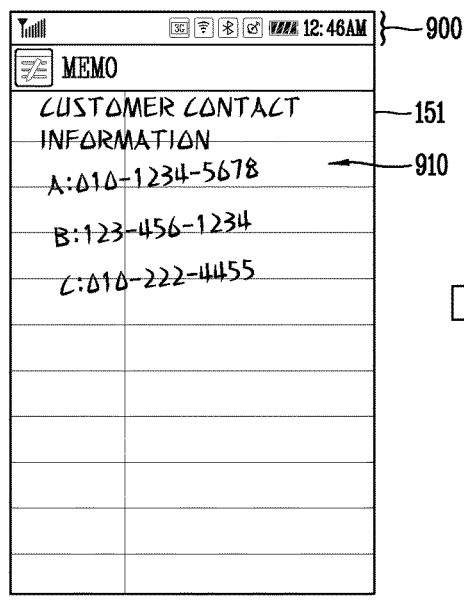
(a)
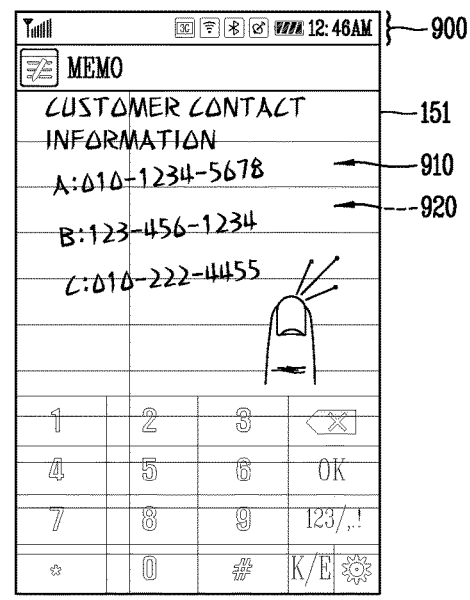
(b)
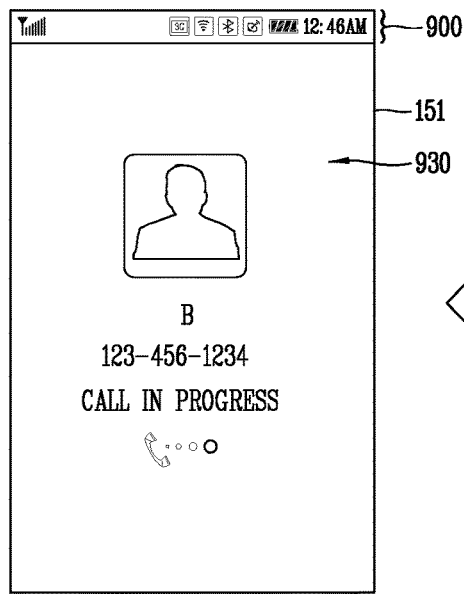
(d)
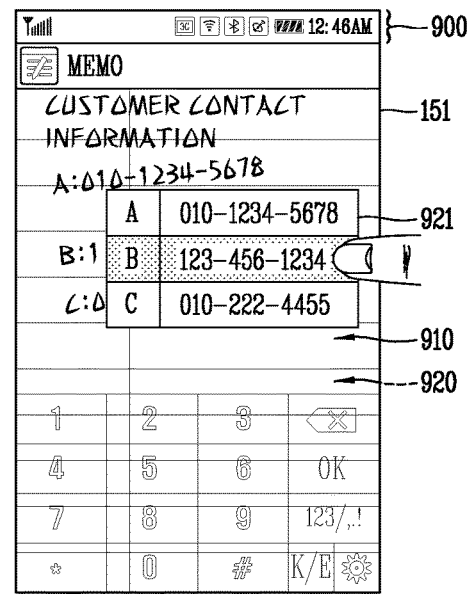
(c)

FIG. 10B
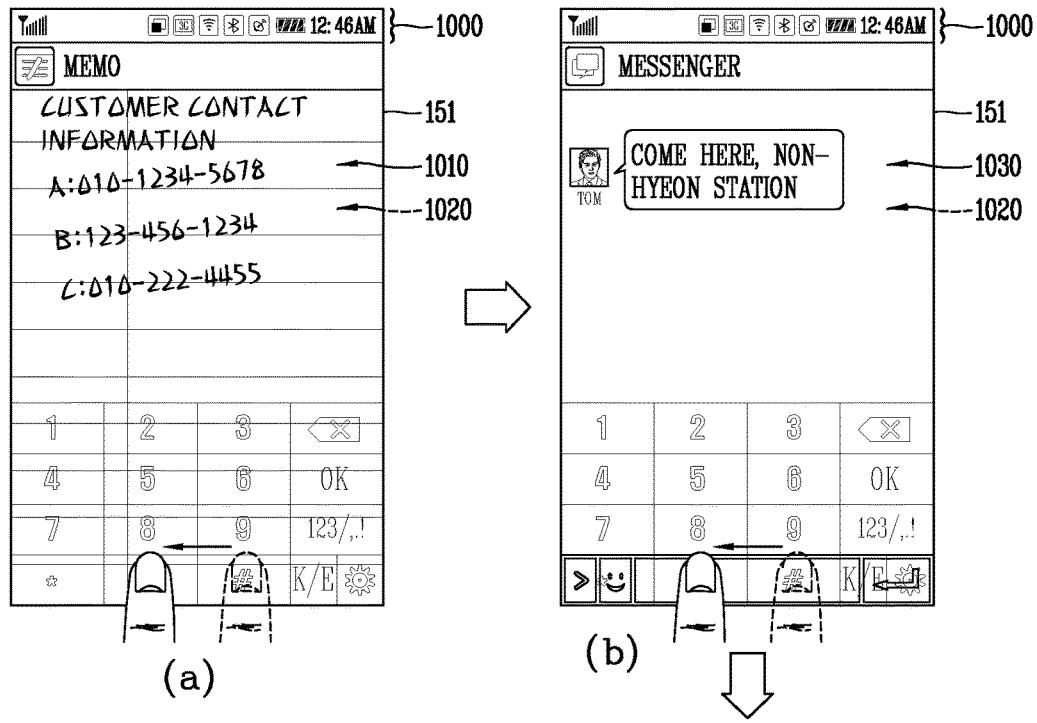
(a)    (b)
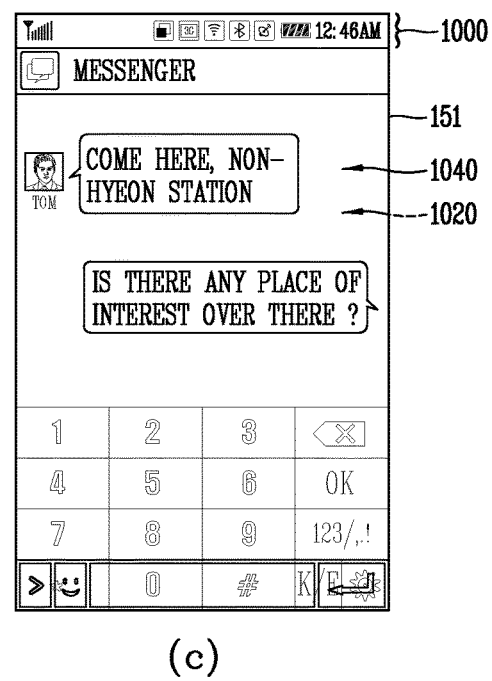
(c)

(a)  (b)

(a)                (b)

FIG. 11C
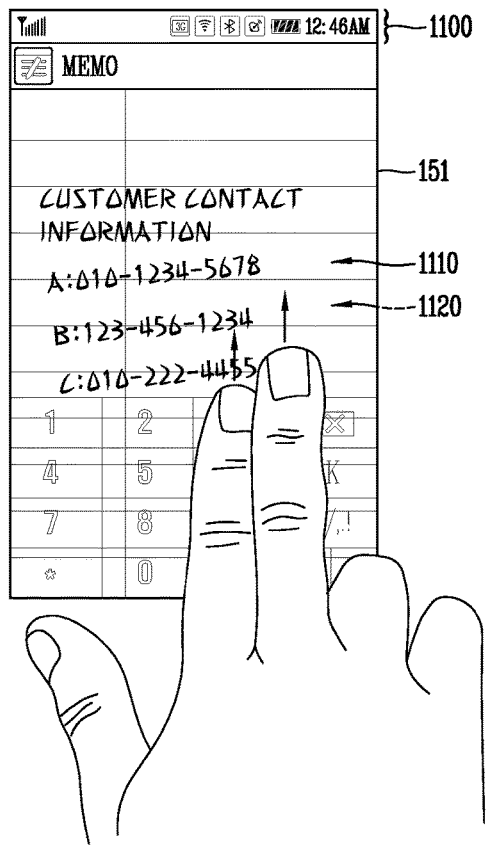
(a)
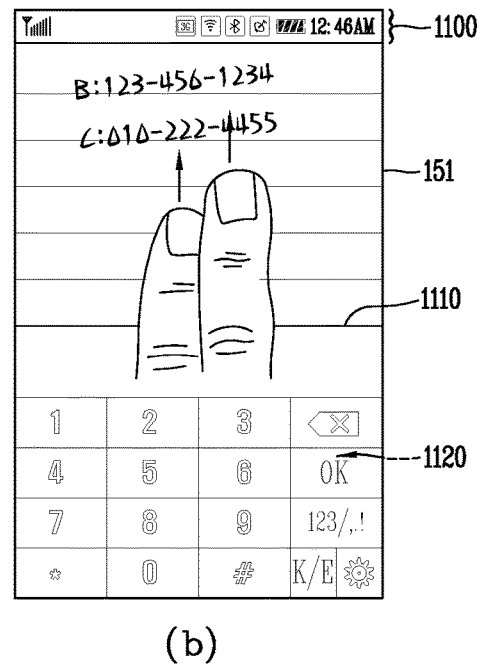
(b)
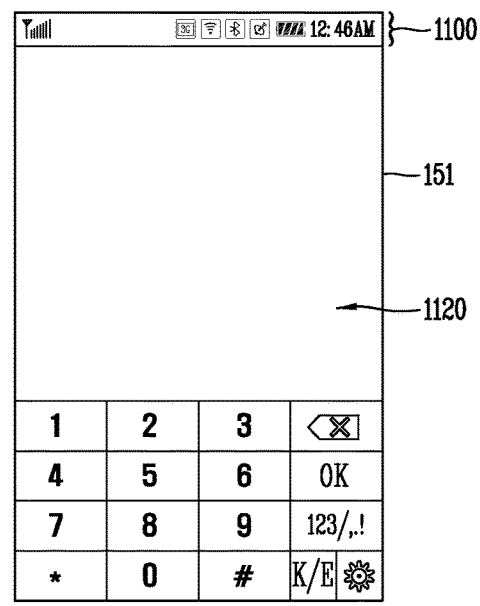
(c)

MOBILE TERMINAL AND METHOD OF CONTROLLING THE MOBILE TERMINAL

CROSS-REFERENCE TO A RELATED APPLICATION

Pursuant to 35 U.S.C. § 119(a), this application claims the benefit of earlier filing date and right of priority to Korean Application No. 10-2013-0068657, filed on Jun. 14, 2013, the contents of which is incorporated by reference herein in its entirety.

BACKGROUND OF THE INVENTION

1. Field of the Invention

The present invention relates to a mobile terminal for outputting visual information and a method of controlling the mobile terminal.

2. Background of the Invention

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal functions as a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

In addition, the provision of various user interfaces suitable for user needs is considered for the mobile terminal.

SUMMARY OF THE INVENTION

Therefore, an aspect of the detailed description is to provide a mobile terminal for providing screen information that is currently output and at the same time providing different screen information and a method of controlling the mobile terminal.

Another aspect of the detailed description is to provide a mobile terminal for enabling a function of another application to be intuitively and conveniently used while an application is currently used and a method of controlling the mobile terminal.

To achieve these and other advantages and in accordance with the purpose of this specification, as embodied and broadly described herein, there is provided a mobile terminal including a display unit on which a first layer including screen information is displayed, and a controller that causes a second layer to overlap at least one part of the first layer displayed on the display unit, based on a user's request, in which at least one part of the screen information included in the first layer is configured to be discernible when the second layer overlaps the at least one part of the first layer.

In the mobile terminal, the screen information displayed on a region that overlaps the at least one part of the first layer, of the screen information included in the second layer may be configured to be discernible when the at least one part of the first layer overlaps the second layer.

In the mobile terminal, one of the first and second layers may be configured to cover the other, and one layer covering the other layer may be configured to be transparent so the screen information included in one layer and the screen information included in the other layer can be discerned at the same time.

In the mobile terminal, the controller may output the screen information relating to at least one part, of the screen information included in the first layer, on the second layer.

In the mobile terminal, the screen information included in the second layer may be an icon for an application or an execution of the application.

In the mobile terminal, if the icon for the application is output on the second layer, the controller may output the icon for the application on a position corresponding to a region in which to include information corresponding to the at least one part, of the screen information included in the first layer.

In the mobile terminal, when the number of the applications associated with the at least one part is two or more, and the screen information corresponding to one of the multiple applications is output on the second layer, if a predetermined-type touch is applied to the display unit, the screen information that is output on the second layer may be switched to the screen information corresponding to the different one of the multiple application.

In the mobile terminal, when one of the first and second layers is in an activated state, the other may be in an inactivated state, and when a touch is applied to the display unit when the first and second layers overlap each other, a control command corresponding to the applied touch may be a control command with respect to the layer currently in the activated state, of the first and second layers.

In the mobile terminal, after a user's request for causing the first and second layers to overlap each other is received, the second layer may be a layer in the activated layer and the first layer may be a layer in the inactivated layer until before a user's request for changing the layer in the activated state is received.

In the mobile terminal, a function icon for receiving the user's request for changing the layer in the activated state may be output on one region of the display unit, and when the touch is applied to the function icon, the controller may change the layer that is in the activated state when applying the touch into the inactivated state and may change the layer in the inactivated state into the activated state.

In the mobile terminal, the user's request may be received based on at least one of a touch with respect to a predetermined region of the display unit, a touch with respect to a specific icon displayed on the display unit, a predetermined-type touch with respect to the display unit, and an input though a key button provided in a case.

In the mobile terminal, if an input window is included in the second layer, the controller may extract information that can be input into the input window, from the screen information included in the first layer, so at least one part of the screen information included in the first layer can be input into the input window.

In the mobile terminal, the extracted information may be automatically input into the input window, or based on a user's selection, is input in the input window.

In the mobile terminal, the controller may store the screen information included in at least one of the first and second layers separately in an image format, based on a user's selection, or may store the first and second layers as are, which are displayed in an overlapping manner on the display unit, in the image format.

In the mobile terminal, the controller may output multiple image objects that can be output on the layer, on the first layer, based on a user's request for changing the screen information that is output on the first layer, and may switch the screen information, which is output on the first layer before receiving the user's request for changing the screen information that is output to the first layer, to the screen information corresponding to the image object selected by a user among the multiple image objects.

In the mobile terminal, the controller may output a third layer for displaying a memo corresponding to a trace of a touch with respect to the display unit, the third layer may overlap at least one part of the first and second layers, and the information corresponding to at least one part that overlaps, of the items of screen information included in the first and second layers may be configured to be discernible.

In the mobile terminal, the outputting of at least one of the first, second, and third layers may be terminated based on a predetermined-type touch with respect to the display unit.

In the mobile terminal, the predetermined-type touch may be a multi-touch that is applied to at least two touch points, and the controller may terminate the outputting of the layer to which to issue a control command corresponding to the touch with respect to the control unit, among the first, second, and third layers, corresponding to the multi-touch.

In the mobile terminal, each of the first and second layers may have a transverse length and a longitudinal length at a right angle to the transverse length, and the transverse length of the first layer may be the same as the transverse length of the second length when the second layer overlaps at least one part of the first layer.

In the mobile terminal, a display region on which the screen information is output may be formed on the display unit, and each of the first and second layers may entirely occupy the display region in the transverse direction.

To achieve these and other advantages and in accordance with the purpose of this specification, as embodied and broadly described herein, there is provided a method of controlling a mobile terminal, including displaying a first layer including screen information on a display unit, receiving a user's request for causing the first layer to overlap a second layer, and causing the second layer to overlap at least one part of the first layer displayed on the display unit, responding to the receiving of the user's request, in which at least one part of the screen information included in the first layer is configured to be discernible when the second layer overlaps the at least one part of the first layer.

In the method, one of the first and second layers may be configured to cover the other, and one layer covering the other layer may be configured to be transparent so the screen information included in one layer and the screen information included in the other layer can be discerned at the same time.

Further scope of applicability of the present application will become more apparent from the detailed description given hereinafter. However, it should be understood that the detailed description and specific examples, while indicating preferred embodiments of the INVENTION, are given by way of illustration only, since various changes and modifications within the spirit and scope of the INVENTION will become apparent to those skilled in the art from the detailed description.

BRIEF DESCRIPTION OF THE DRAWINGS

The accompanying drawings, which are included to provide a further understanding of the INVENTION and are incorporated in and constitute a part of this specification, illustrate exemplary embodiments and together with the description serve to explain the principles of the INVENTION.

FIG. 1 is a block diagram illustrating a mobile terminal according to one embodiment of the present invention;

DETAILED DESCRIPTION OF THE INVENTION

Figure 2A:
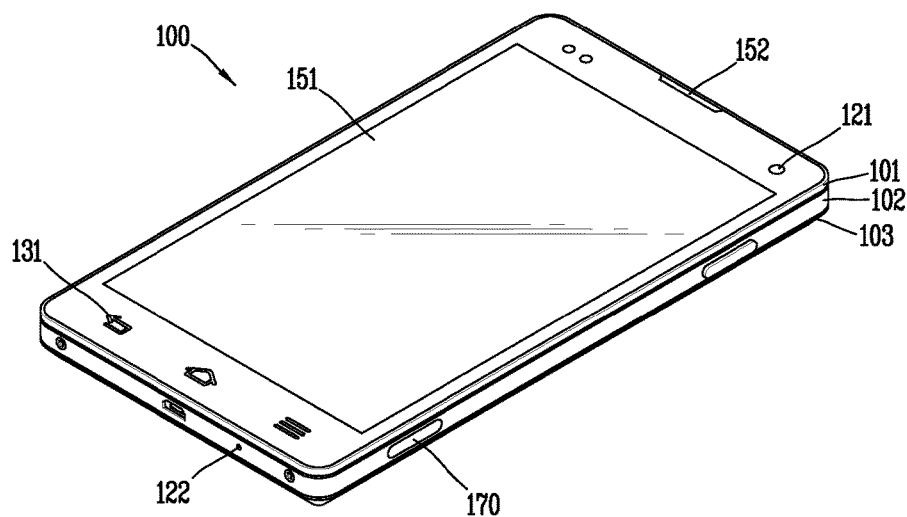
FIGS. 2A and 2B are perspective views, each illustrating the mobile terminal according to one embodiment of the present invention when viewed from the front and rear sides, respectively.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

FIG. 1 is a block diagram of a mobile terminal according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure. Here, the touch object is an object to apply touch to the touch sensor, which may be a finger, a touch pen, a stylus pen, a pointer, etc.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. In addition, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2B:
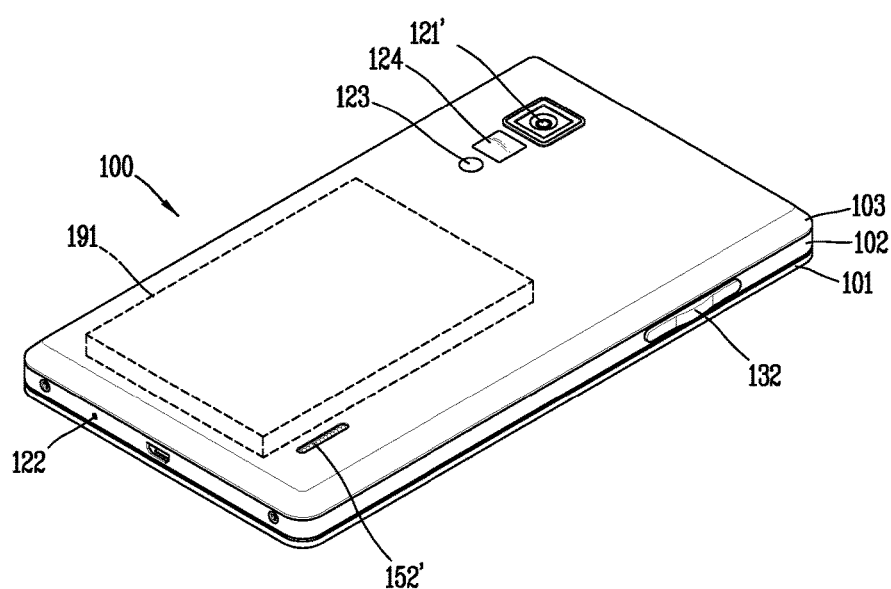

FIG. 2A is a front perspective view of the mobile terminal according to an embodiment of the present invention, and FIG. 2B is a rear perspective view of the mobile terminal according to an embodiment of the present invention The mobile terminal 100 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction. A case (casing, housing, cover, etc.) forming an outer appearance of the body 100 may include a front case 101 and a rear case 102. A space formed by the front case 101 and the rear case 102 may accommodate various components therein. At least one intermediate case 103 may further be disposed between the front case 101 and the rear case 102.

Such cases may be formed by injection-molded synthetic resin, or may be formed using a metallic material such as stainless steel (STS) or titanium (Ti). At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands input through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 such as a battery 191 for supplying power to the mobile terminal 100 is mounted to the body. The power supply unit 190 may be mounted in the body, or may be detachably mounted to the body.

A touch pad for sensing touch may be additionally mounted to the rear case 102. Like the display 151, the touch pad may be formed to be light-transmissive. In this instance, if the display 151 is configured to output visual information from two surfaces thereof, the visual information can be recognized through the touch pad. The information output from the two surfaces can be controlled by the touch pad. Alternatively, a display may be additionally mounted to the touch pad, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. Further, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

The audio output unit 152' may be additionally arranged on a rear surface of the body. The audio output unit 152' may cooperate with the audio output unit 152 so as to implement a stereo function. Also, the audio output unit may be configured to operate as a speakerphone.

The power supply unit 190 for supplying power to the mobile terminal 100 is mounted to the body. The power supply unit 190 may be mounted in the body, or may be detachably mounted to the body.

The touch pad operates in association with the display 151 of the front case 101. The touch pad may be disposed on the rear surface of the display 151 in parallel. The touch pad may have a size equal to or smaller than that of the display 151.

In the mobile terminal according to one embodiment of the present invention, which is capable of including at least one or more of the constituent elements as described above, screen information that is currently output and different screen information can be provided together.

That is, in the mobile terminal according to one embodiment of the present invention, a first layer (or a "first virtual layer," and hereinafter referred to as the "first layer" for convenience) in which the screen information that is currently output is included and a second layer (or a "second virtual layer", and hereinafter referred to as the "second layer" for convenience) in which the different screen information is included are superimposed to use the screen information that is currently output on the display unit and the different screen information together. Thus, the items of screen information that are different from each other can be provided through the first and second layers at the same time.

Therefore, the user can use the screen information included in the second layer, while at the same time using the screen information included in the first layer. Furthermore, if the items of screen information included in the first and second layers are associated with each other, the user can use the items of information that are associated with each other, more conveniently on one display screen.

A method of providing different items of screen information through multiple layers is described in detail below referring to the accompanying drawings. A description is provided using as an example a method of providing a function associated with the screen information that is output on the display unit is described.

Figure 3:
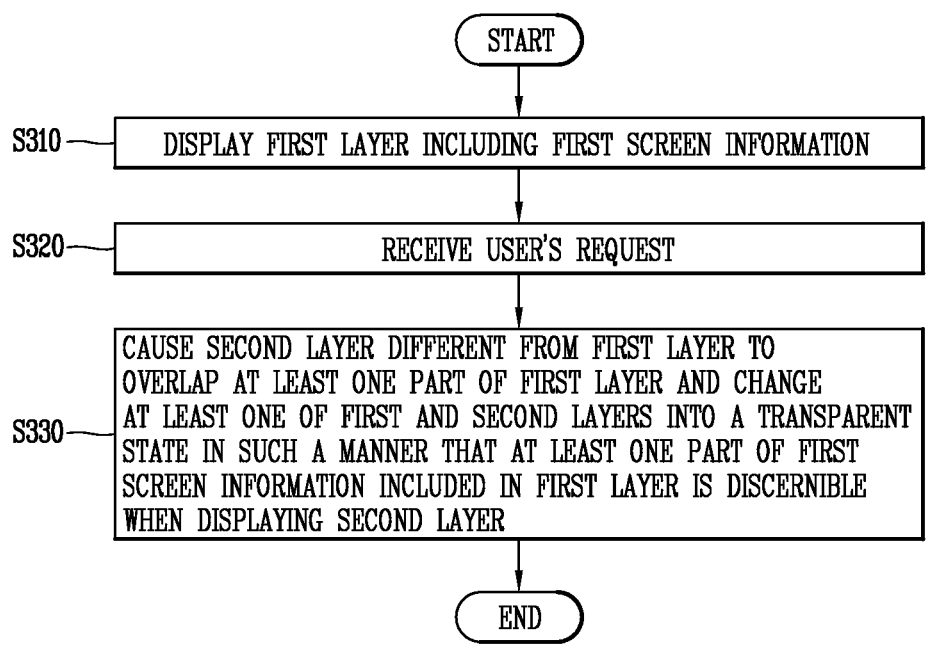
FIG. 3 is a flowchart illustrating a method of controlling the mobile terminal according to one embodiment of the present invention.
Figure 4A:
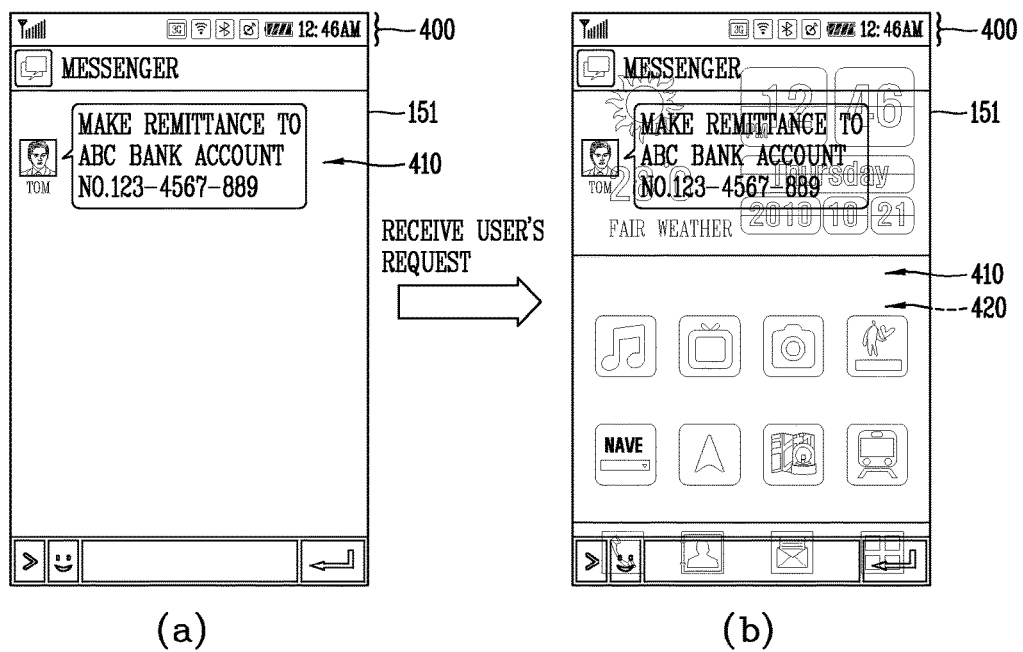
FIGS. 4A(a), 4A(b), FIG. 4B, FIG. 4C(a) and FIG. 4C(b) are diagrams describing the control method in FIG. 3.
Figure 4B:
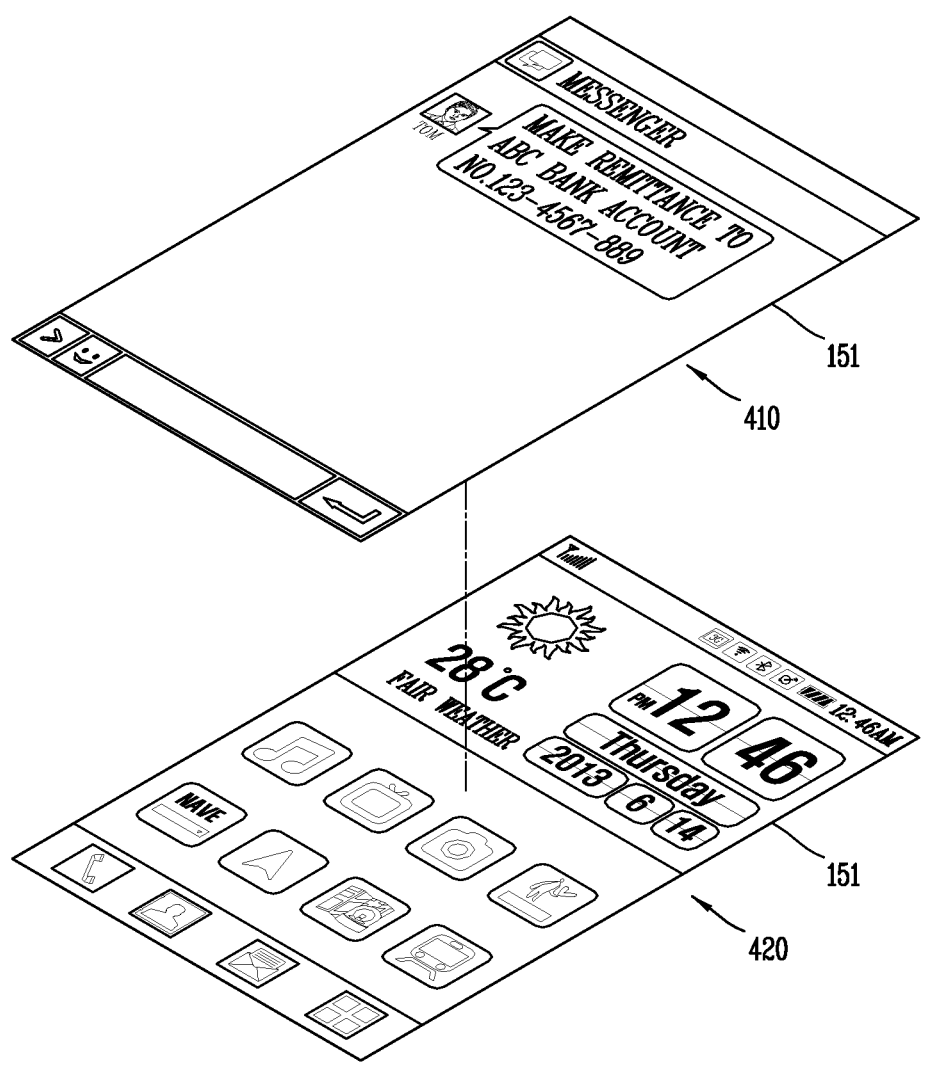
Figure 4C:
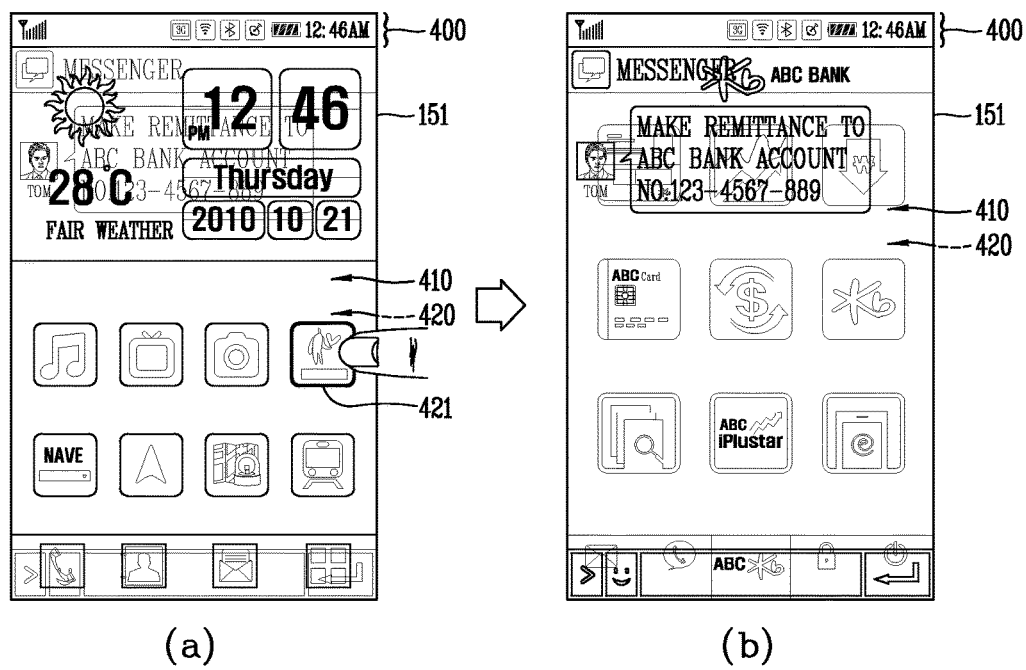

FIG. 3 is a flowchart illustrating a method of controlling the mobile terminal according to one embodiment of the present invention, and FIGS. 4A-4C are diagrams describing the control method in FIG. 3. As shown, the controller 180 displays the first layer including the screen information (S310).

Further, the screen information included in the first layer includes various items of information that can be output on the display unit 151. Examples of the screen information include an execution screen of an application execution, a page screen of the home screen, a menu screen, a screen that corresponds to a function executed at a user's request, and an alarm screen that gives notification of an occurrence of an event.

Thus, the screen information included in the first layer is a screen that is displayed by normal operation of the mobile terminal 100. Further, the layer is a type of virtual plane including the screen information that is output on the display unit. If the multiple layers are not superimposed, the controller 180 controls the display unit 151 so the screen information is included on the layer at the same level of the display hierarchy.

For example, when receiving a control command for switching an arbitrary execution screen of a first application to an arbitrary execution screen of a second application, the controller 180 outputs the execution screen of the second application to the same layer as the layer in which the execution screen of the first application is included. In addition, the controller 180 causes the execution screen of the second application to be included in a different layer at the same level as the level at which the layer in which the execution screen of the first application is included is.

A user's request is then received when the first layer including arbitrary screen information is displayed in this manner (S320). Further, the user's request is for additionally outputting different screen information while continuously outputting at least one part of the screen information included in the first layer on the display unit 151.

The user's request can be received through various methods. The method of receiving the user's request is described below. Further, when receiving the user's request, at least one part of the first layer currently displayed on the display unit is caused to overlap the second layer (S330).

When the first and second layers overlap each other, at least one part of the screen information included in the first layer is configured to be discernible also when the second layer overlaps at least one part of the first layer. That is, the controller 180 causes at least one part of the first layer to overlap the second layer and changes at least one of the first and second layers into a transparent state so the screen information corresponding to overlapping portions of the first and second layers of the screen information in the first layer can be continuously discerned.

In addition, the screen information displayed on a region that overlaps at least one part of the first layer, of the screen information included in the second layer, is configured to be discernible also when at least one part of the first layer overlaps the second layer. More specifically, one of the first and second layers is configured to cover the other, and one layer covering the other layer is configured to be transparent so the screen information included in one layer and the screen information included in the other layer are discernible at the same time.

That is, the controller 180 controls the display unit 151 so the items of screen information included in the first and second layers are discernible to the user at the same time when the first and second layers overlap each other. The screen information included in the first layer that overlaps the second layer is the screen information, which is included in one region selected by the user, of the screen information included in the first layer.

Further, when the first layer and the second layer overlap each other, the screen information output on the first layer can be a captured image obtained by capturing an image of the screen information that is being output on the first layer when receiving the user's request. That is, when receiving the user's request, the controller 180 captures an image of the screen information included on the first layer and outputs the captured image along with the second layer so the captured image and the second layer overlap each other.

Further, even though the captured image is output on the first layer, an application that corresponds to the screen information that is output on the first layer before receiving the user's request operates continuously. In addition, when receiving the user's request, the controller 180 outputs the screen information itself included on the first layer along with the second layer so the screen information included and the second layer overlap each other.

In this instance, the application that corresponds to the first layer continuously operates with multitasking at work and accordingly, the screen information present on the first layer is changed without a user's operation. Referring to the drawings in association with what is described above, in the mobile terminal according to one embodiment of the present invention as illustrated in FIG. 4A(a), a first layer 410 including the screen information is output on the display unit 151. Further, a status information display region (or a status bar 400) in which status information is included is included on the first layer 410, and if a different layer from the first layer 410 is present, is included on the different layer. That is, the status information display region is always included on the display unit 151 regardless of which layer is currently output.

Further, as illustrated in FIG. 4A(a), when receiving the user's request when the first layer 410 is displayed, the controller 180 displays the first layer 410 and a second layer 420 so the first layer 410 and the second layer 420 overlap each other as illustrated in FIG. 4A(b). Therefore, the items of screen information included in the first and second layers 410 and 420, respectively, are all output on the display unit 151.

As illustrated in FIG. 4B, the first and second layers 410 and 420 are of hierarchical structure. That is, one of the first and second layers 410 and 420 is configured to cover the other. As illustrated, if the first layer 410 covers the second layer 420, the controller 180 changes the first layer 410 into a transparent state and thus, discerns the screen information included in the second layer 420 along with the screen information included in the first layer 410.

Further, the first and second layers 410 and 420 are the same size, and correspond to a size of the display unit. Further, each of the first and second layers 410 and 420 has a region in which the status information display region is to be included, and as described above, the status information is output on only one of the first and second layers 410 and 420.

Further, if a touch is applied to the display unit 151 when the first and second layers 410 and 420 overlap each other, the controller 180 recognizes a control command corresponding to the touch as a control command for one of the first and second layers 410 and 420. For example, when one of the first and second layers 410 and 420 is in an activated state, the other is in an inactivated state. If the touch is applied to the display unit when one layer is activated, the control command corresponding to the touch is recognized as a control command for the currently-activated one of the first and second layers.

Which one of the first and second layers 410 and 420 is activated is determined based on a user's selection. Each of the first and second layers 410 and 420 is changed or switched from the activated state to the inactivated state or vice versa. Then, the controller 180 determines (or recognizes or acknowledges) that one of the first and second layers 410 and 420 is in the activated state (or until before the user makes a selection as to which one of the first and second layers 410 and 420 is activated).

For example, after receiving the user's request for causing the first and second layers 410 and 420 to overlap each other, the second layer 420 is in the activated state and the first layer 410 is in the inactivated state until before receiving the user's request for changing the layer currently in the activated layer.

Therefore, as illustrated in FIGS. 4C(a) and 4C(b), if the touch is applied to the display unit 151 when the first and second layers 410 and 420 overlap each other, the controller 180 determines the touch as a control command for the second layer 420.

Therefore, as illustrated in FIG. 4C(a), when the touch is applied to a position on which an arbitrary icon 421 is displayed, on the screen information included in the second layer 420, the controller 180 drives an application corresponding to the arbitrary icon 421 as illustrated in FIG. 4C(b). Therefore, as illustrated in FIG. 4C(b), the screen information included in the second layer 420 is changed based on the touch.

As described above, the mobile terminal according to one embodiment of the present invention and the method of controlling the mobile terminal, the multiple items of screen information are used through the multiple layers at the same time by causing the multiple layers, each containing different screen information, to overlap each other. Therefore, this satisfies the user's needs for using the multiple items of screen information.

A method of receiving the user's request is described in detail below referring the accompanying drawings. FIGS. 5A-5G are diagram illustrating a method of outputting the second layer in the mobile terminal according to one embodiment of the present invention. As described above, the user's request is for additionally outputting different screen information, on the second layer, while continuously outputting at least one part of the screen information included in the first layer on the display unit 151.

Figure 5A:
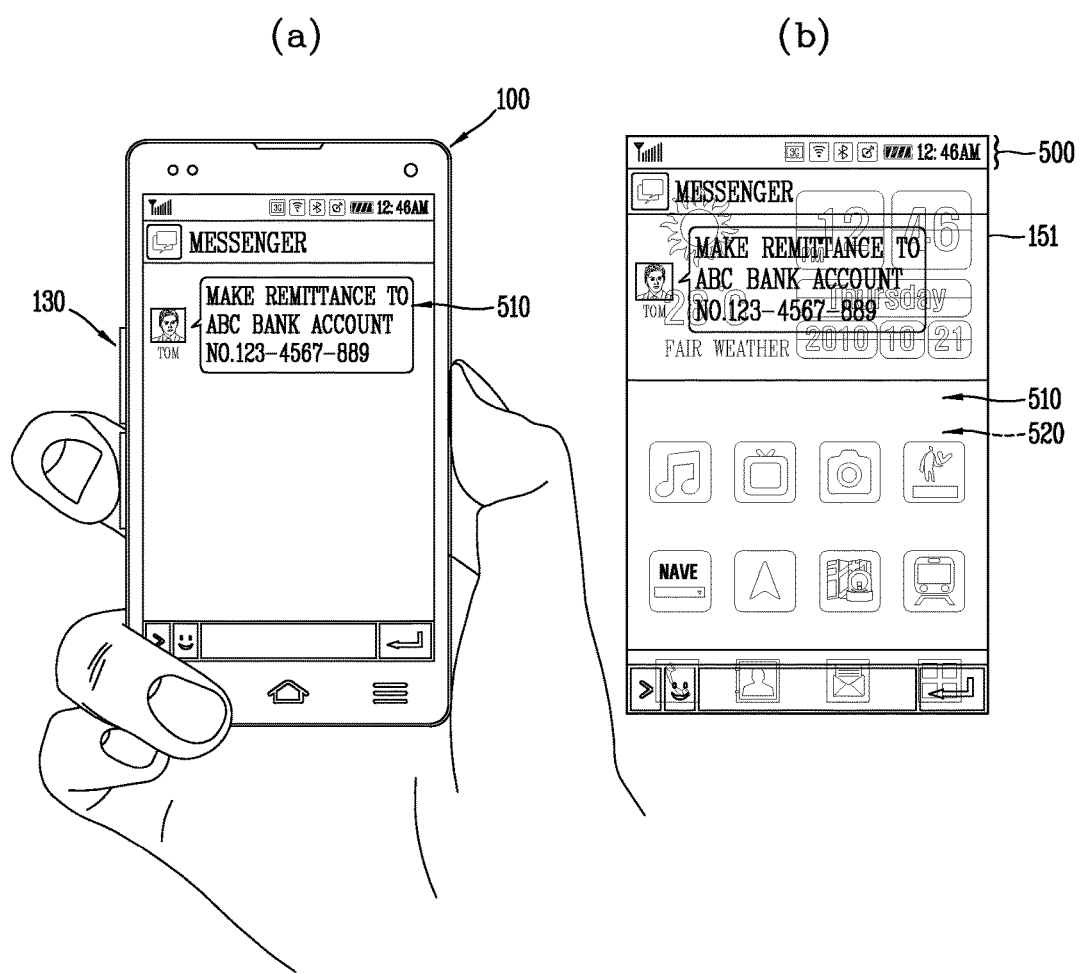
FIGS. 5A(a) and 5A(b), 5B(a) and 5B(b), 5C(a) and 5C(b), 5D(a) to 5D(c), 5E(a) and 5E(b), 5F(a) and 5F(b), and 5G(a) and 5G(b) are diagrams illustrating a method of outputting a second layer in the mobile terminal according to one embodiment of the present invention.

The user's request is received in various ways. As one example, as illustrated in FIG. 5A(a), the user's request is received if the user applies pressure to a hardware key (or the user input 130) provided in a main body (or the case 100) of the mobile terminal. Further, if the hardware key is a touch key, the user's request is received when the touch is applied to the touch key. Further, a status information display region (or a status bar 500) is displayed.

As another example, as illustrated in FIG. 5B(a), the user's request is received based on a predetermined distance above which the main body 100 of the mobile terminal moves. The movement of the mobile terminal is sensed by at least one of a terrestrial magnetism sensor, a gyro sensor, and an acceleration sensor. That is, as illustrated in FIG. 5B(b), the controller 180 causes the first and second layers 510 and 520 to overlap each other when receiving the movement of the mobile terminal.

Figure 5C:
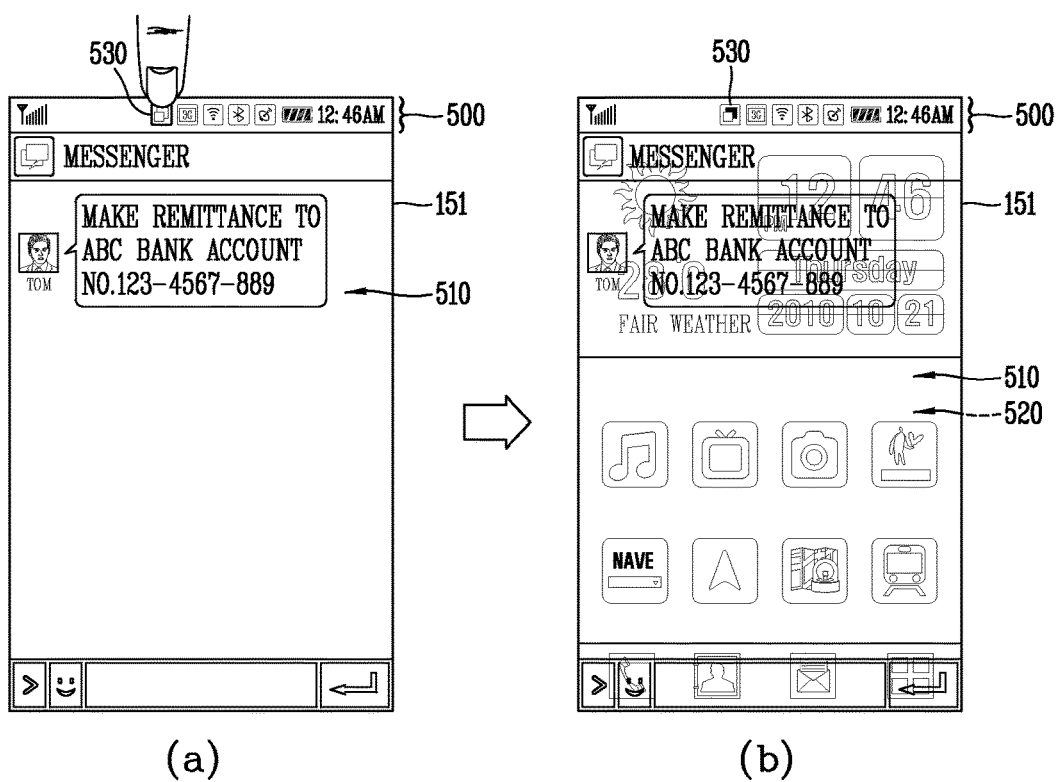

As another example, as illustrated in FIG. 5C(a), the user's request is received based on the application of the touch to a specific icon 530. That is, as illustrated in FIG. 5C(b), the controller 180 causes first and second layers 510 and 520 to overlap each other when receiving the touch input with respect to the icon 530.

Figure 5D:
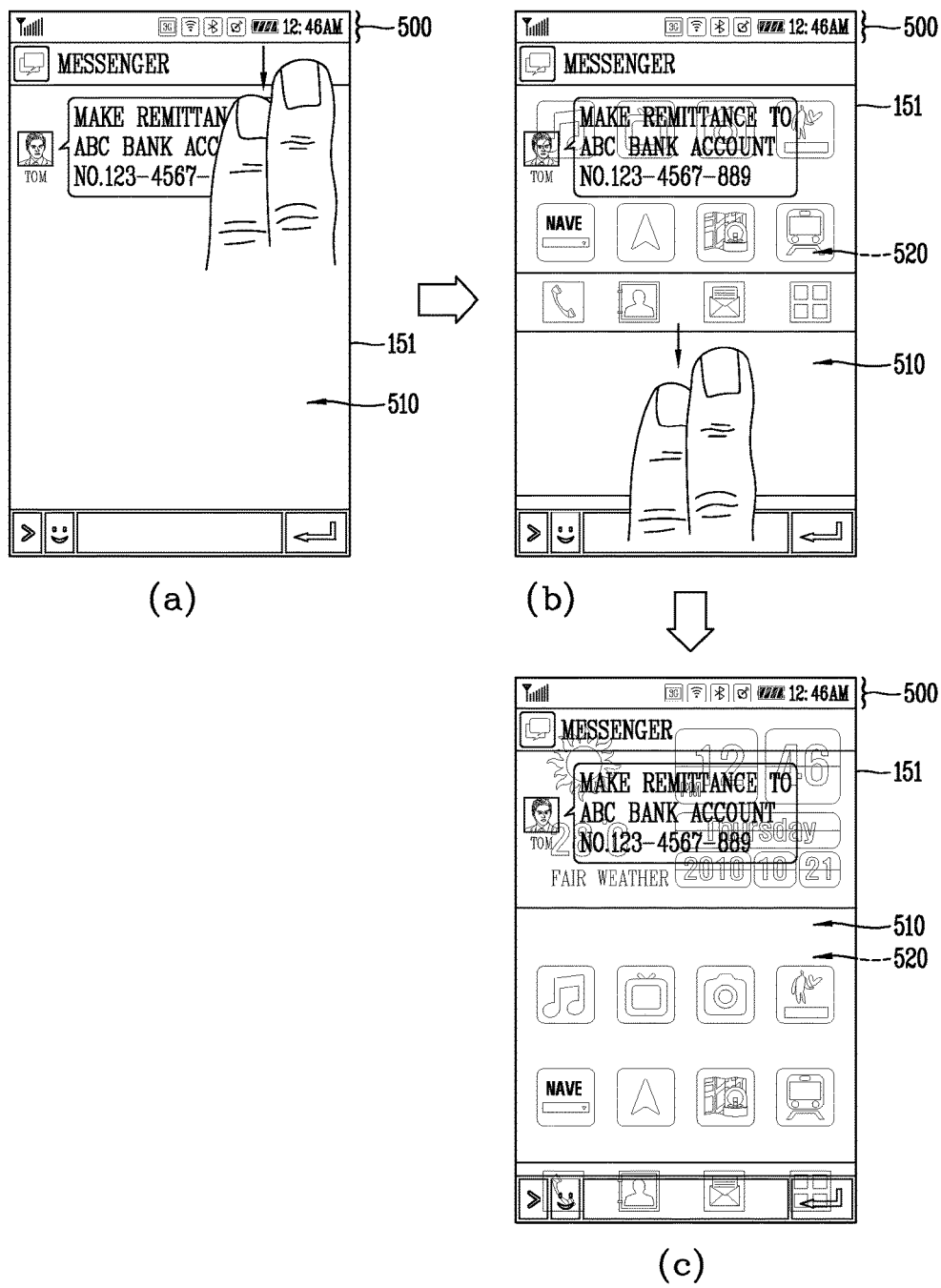

As another example, as illustrated in FIG. 5D(a)-(c), the user's request is received when a predetermined-type touch (for example, a drag touch that starts from a status information display region 500, a multi-time touch with respect to the status information display region 500, or the like) is applied to a predetermined region (for example, the status information display region 500) of the display unit 151.

As illustrated in FIG. 5D(b) and (c), the controller 180 causes the first and second layers 510 and 520 to overlap each other when receiving the touch and drag input. In addition, the user's request may be received when a multi-touch in which multiple points on the display unit 151 are touched on at the same time is applied. Furthermore, the user's request received when the multi-touch may be applied in a predetermined manner (for example, a drag in a multi-touched state).

Figure 5E:
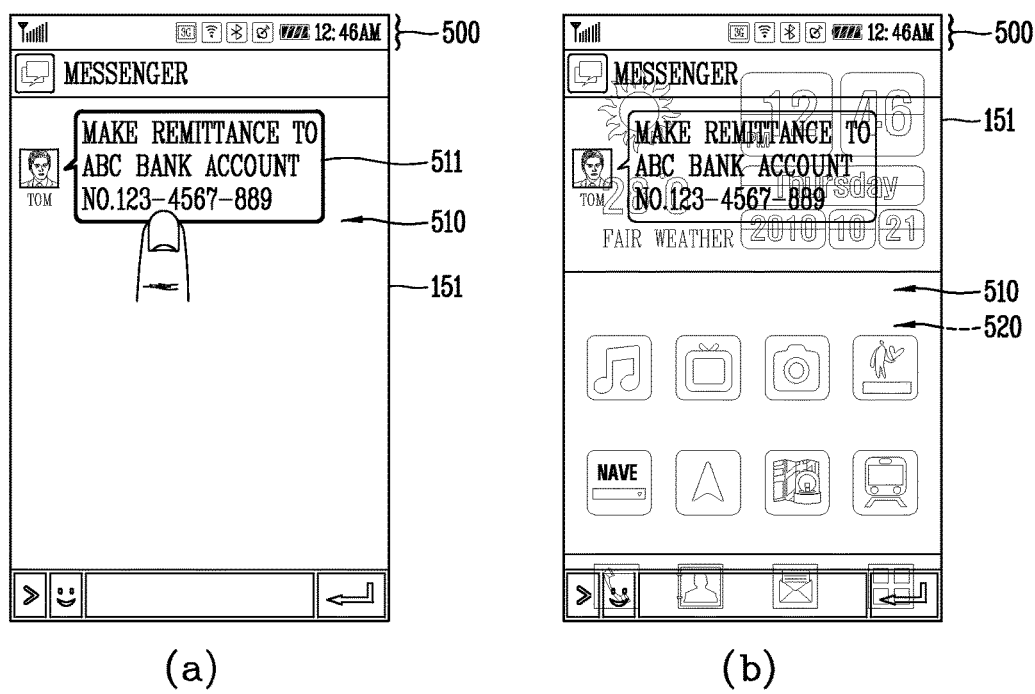

As another example, as illustrated in FIG. 5E(a), the user's request is received when a predetermined-type touch (for example, a long touch) is applied to at least one part of the screen information included in a first layer 510. In this instance, as illustrated in FIG. 5E(b), the controller 180 causes the entire screen information included in the first layer 510 to overlap a second layer 520. In addition, the controller 180 may cause only the screen information corresponding to the at least one part, of the screen information included in the first layer 510, to overlap the second layer 520.

As another example, as illustrated in FIG. 5F(a), the user's request is received based on the selection of one region 511 of the first layer 510. The one region 511 is a region corresponding to a trace of the touch with respect to the display unit 151. In this instance, as illustrated in FIG. 5F(b), the controller 180 causes the entire screen information included in the first layer 510 to overlap the second layer 520.

In addition, the controller 180 causes only the screen information corresponding to the selected one region, of the screen information included in the first layer 510, to the second layer 520.

Figure 5G:
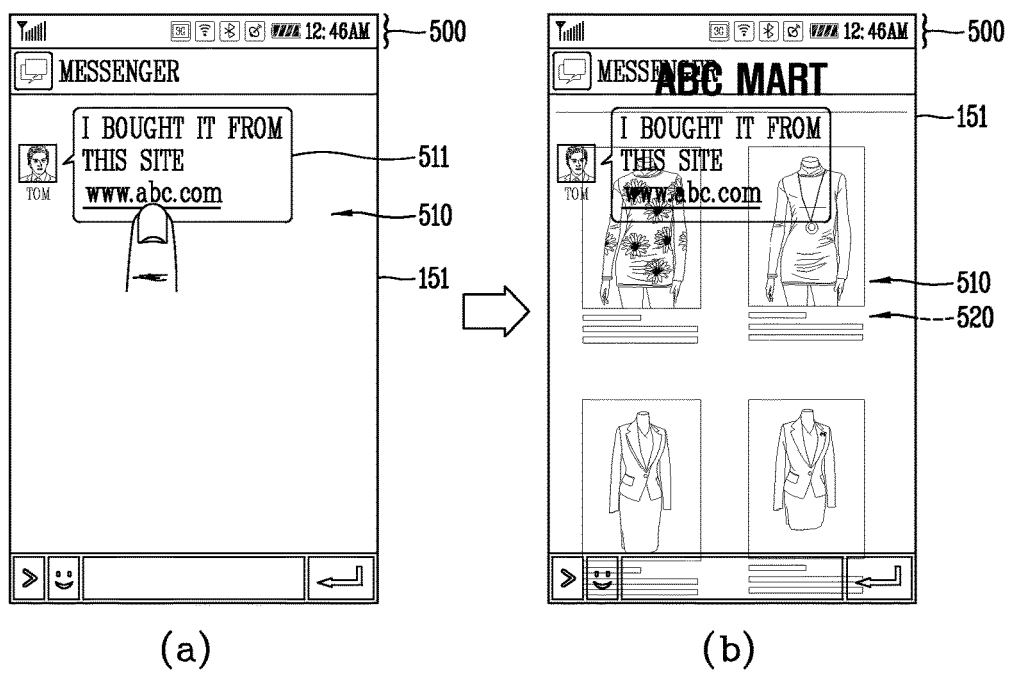

As another example, as illustrated in FIG. 5G(a), the user's request is received based on the selection of the information corresponding to a predetermined property, of the screen information included in the first layer 510. Further, the information corresponding to the predetermined property is URL information as illustrated. As illustrated, when the URL information 511 on the first layer 510 is selected, the screen information corresponding to the URL information is output on the second layer 520 as illustrated in FIG. 5G(b). That is, the controller 180 outputs information relating to the selected information 511 to the second layer 520.

As another example, the information corresponding to the predetermined property is information linked to different information. For example, if the part on which the information is displayed is selected, the information linked to different information is information that is linked to the different information that is to be output corresponds to the selection. For example, the information linked to the different information is a pop-up window or an icon that gives notification of receiving of an event. For example, if the pop-up window giving the notification of receiving of a message is output and a graphic object through which to execute a "message view" is included in the pop-up window, the received message is output when the graphic object is output. In this instance, the pop-up window is output on the first layer and the received message is output on the second layer.

Further, the method of receiving the user's request is not limited to the methods described above and the user's request is received in various ways.

A method of switching the layer to which to apply the control command corresponding to the touch with respect to the display unit among the multiple layers is described in detail below referring to the accompanying drawings. FIGS. 6A- and 6B are diagrams illustrating the control command to the layer in the mobile terminal according to one embodiment of the present invention.

As illustrated above in FIG. 4A(b) and FIG. 4C(a), when the touch is applied the display unit 151 when the first and second layers overlap each other, the controller 180 recognizes the control command corresponding to the touch as one of the first and second layers.

When one of the first and second layers 410 and 420 is in the activated state, the other is in the inactivated state. If the touch is applied to the display unit when one layer is activated, the control command corresponding to the touch is recognized as the control command to the currently-activated one of the first and second layers.

That is, when one of the first and second layers is in the activated state, the other is in the inactivated state. If the touch is applied to the display unit when one layer is activated, the control command corresponding to the touch is recognized as the control command to the currently-activated one of the first and second layers.

For example, as illustrated in FIG. 6A(a), if a second layer 620 is activated, when an icon 621 included in a second layer 620 is selected, the screen information on the selected icon 621 is output on the second layer as illustrated in FIG. 6A(b). Then, when receiving the user's request for changing the layer in the activated state by selecting icon 601 as illustrated in FIG. 6A(b), the controller 180 determines the control command corresponding to the touch applied to the display unit 151 as a control command to a first layer 610 and controls the first layer 610, based the control command as illustrated in FIGS. 6A(c) and 6A(d).

Figure 6B:
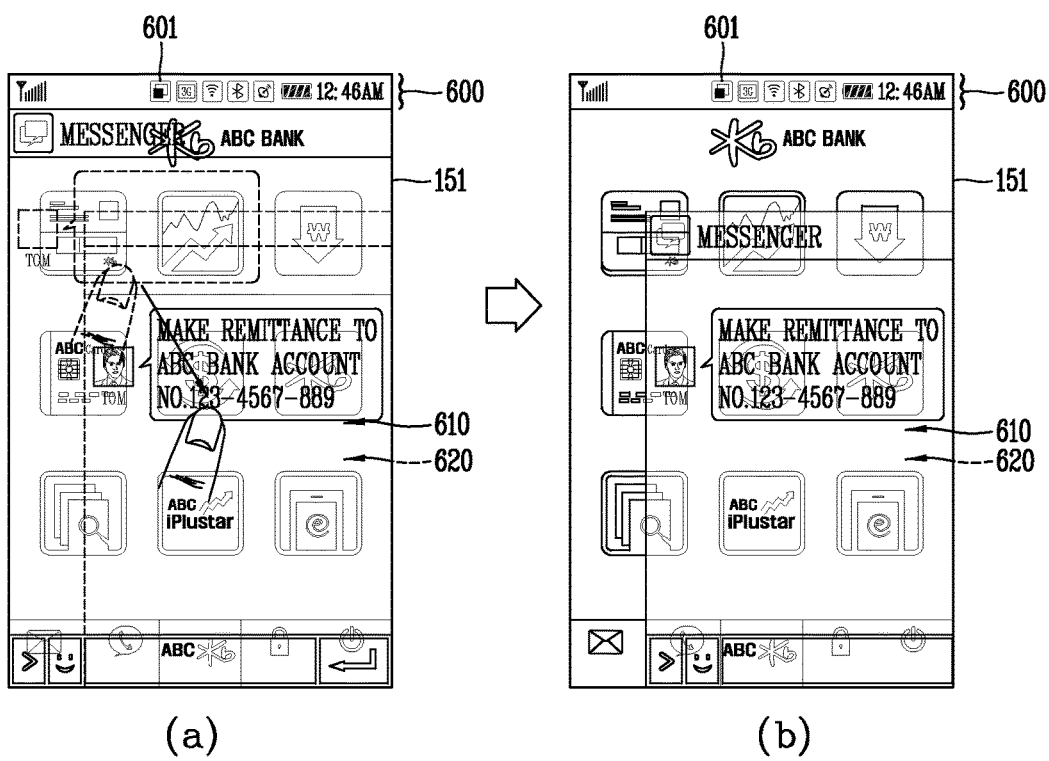
FIGS. 6A(a) to 6A(d) and 6B(a) and 6B(b) are diagrams illustrating a control command to the layer in the mobile terminal according to one embodiment of the present invention.

Further, in FIGS. 6A(a) to 6A(d) illustrates an example in which the information included in the first layer 610 is the execution screen of the application itself. For example, if the first layer 610 is in the activated state and the screen information is the captured image included in the first layer 610, when the touch (for example, the drag touch) is applied to the display unit 151, the layer 610 itself is moved as illustrated in FIGS. 6B(a) and 6B(b). In addition, the controller 180 changes a size of the first layer 610, based on the touch with respect to the display unit 151.

The user's request for changing the layer in the activated state is received based on the selection of a specific icon 601 as illustrated in FIG. 6A(b). A position on which the specific icon 601 is output is not limited to the position illustrated in FIG. 6A(b) and the specific icon 601 may be output on an arbitrary position on the display unit. In addition, also after outputting the icon 601, the position on which the icon 601 is output is changed based on the user's selection. For example, the position of the icon 601 is changed based on the drag touch with respect to the icon 601.

In addition, the controller 180 changes a visual exterior appearance of the icon 601 in order to notify the user of the layer currently in the activated state. For example, the controller 180 controls the display unit 151 so the visual exterior appearance (refer to FIG. 6A(b)) of the icon 601 that results when the second layer 620 is in the activated state is different from the visual exterior appearance (refer to FIG. 6A(c)) of the icon 601 that results when the first layer 610 are in the activated state.

As described above, in the mobile terminal according to one embodiment of the present invention and the method of controlling the mobile terminal, the first and second layers are output at the same time and the first and second layers are freely controlled.

The screen information displayed on the second layer is described in detail below referring the accompanying drawings. FIGS. 7 and 8 are diagrams illustrating a method of providing the screen information relating to the first layer to the second layer in the mobile terminal according to one embodiment of the present invention.

In the mobile terminal according to one embodiment of the present invention, the controller 180 causes the screen information relating to at least one part, of the screen information included in the first layer, to be included on the second layer. Further, there are various types of information included on the second layer. For example, the information that can be included on the second layer may be an icon for an application, an execution screen of an application, an image stored in the memory, a moving image, an electronic document, or the like. In addition, the information that is displayed on the display unit 151 before displaying the screen information included on the first layer is included in the second layer.

When receiving the user's request for outputting the second layer, the controller 180 analyzes the content of the screen information included in the first layer and outputs the screen information corresponding to the analyzed content to the second layer.

Further, types of screen information to be included in the second layer can be stored in advance in the memory 160. That is, the type of screen that can be output on the second layer is matched to the type of screen information included in the first layer and is stored in the memory 160. Therefore, after analyzing the first information, the controller 180 causes the proper information to be included on the second layer referring to the information (or matching information) stored in the memory 160.

Figure 7A:
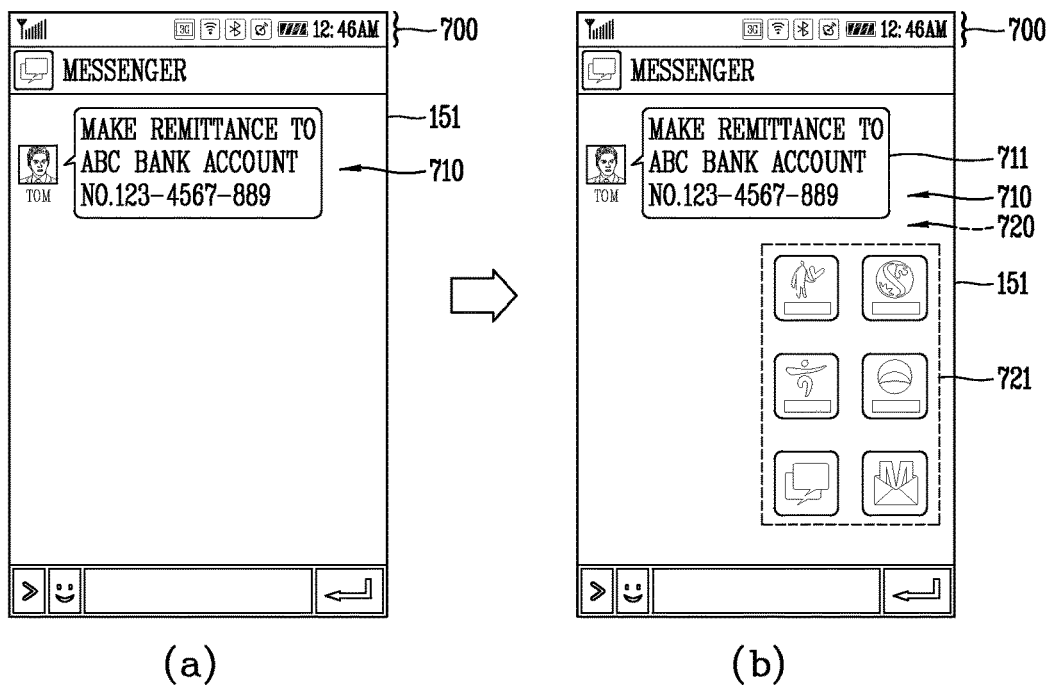
FIGS. 7A(a) and 7A(b), 7B(a) to 7B(c), 7C(a) to 7C(c), 8A, and 8B(a) to 8B(c) are diagrams illustrating a method of providing screen information relating to a first layer to the second layer in the mobile terminal according to one embodiment of the present invention.

As one example, as illustrated in FIG. 7A(a), if the information included in the first layer 710 relates to a "finance transaction," the controller 180 displays icons 721 for at least one application corresponding to a finance transaction function to the second layer 720 as illustrated in FIG. 7A(b).

Further, when outputting the icons for the application, the controller 180 displays the icon for the application on the vicinity of the region including the information that has the closest relation to the icon for the application to be included in the second layer, of the screen information included in the first layer, in order to further improve user convenience.

Figure 7B:
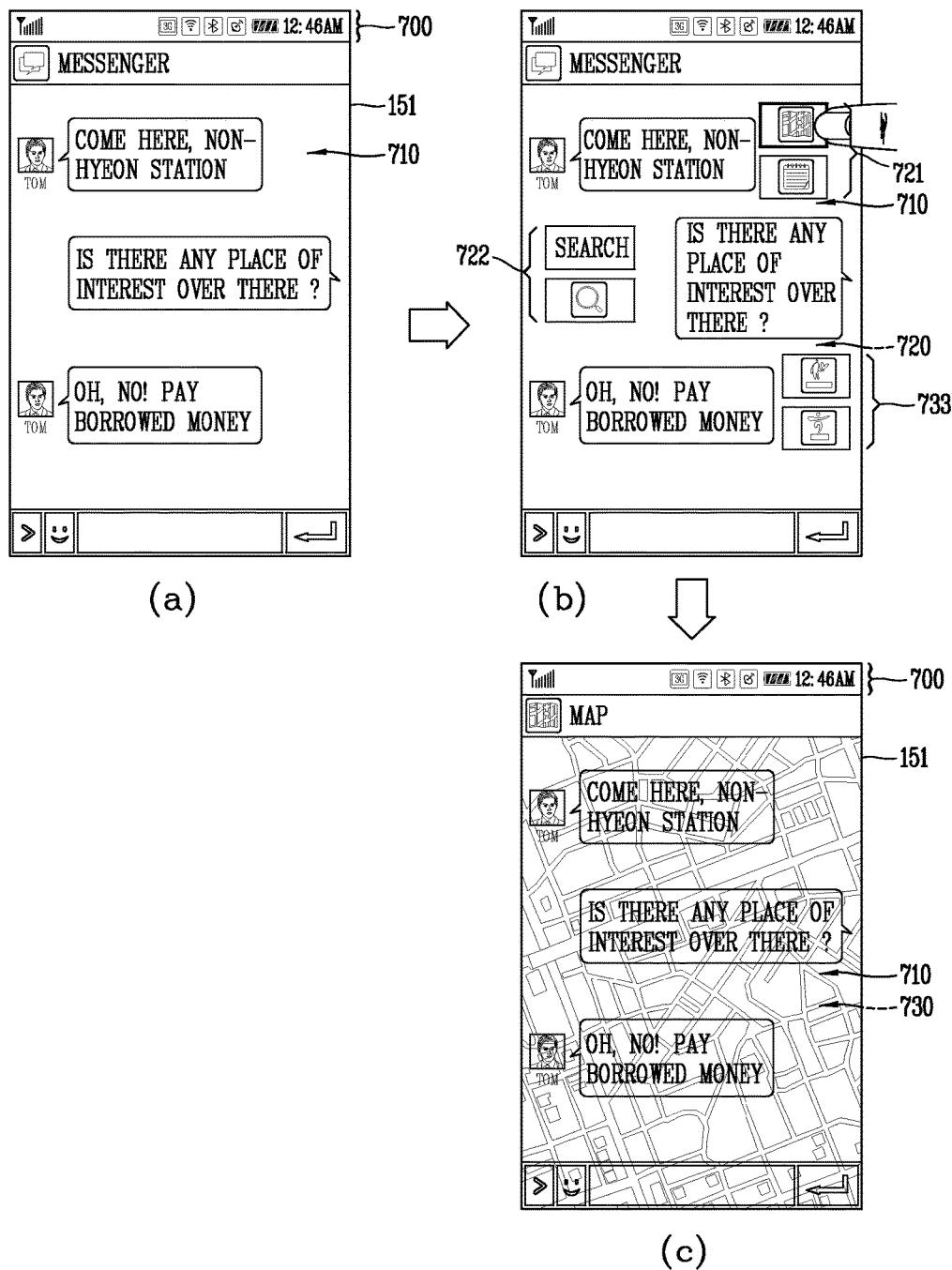

For example, as illustrated in FIGS. 7B(a) and (b), icons 721 for an application that has a "map" function and for an application that has a "scheduling" function are displayed the vicinity of the information "Non-Hyoun Station." Then, an icon 722 for an application that has a "search" function is output on the vicinity of the information "Is there any place of interest over there?" In addition, the icons 723 for the application that has the "finance transaction" function and for the application that has the "scheduling" function are output on the vicinity of the information "finance transaction."

Further, when one of the icons for the application is selected, the controller 180 displays the screen information corresponding to the icon for the selected application to a second layer 730 as illustrated in FIG. 7B(c).

As another example, if the screen information included in the first layer 710 relates to the "finance transaction" and to a "messenger" as illustrated in FIG. 7A(a), the controller 180 displays the execution screen of the application associated with the "finance transaction" or a "message" directly to the second layer 720 as illustrated in FIG. 7A(b).

Figure 7C:
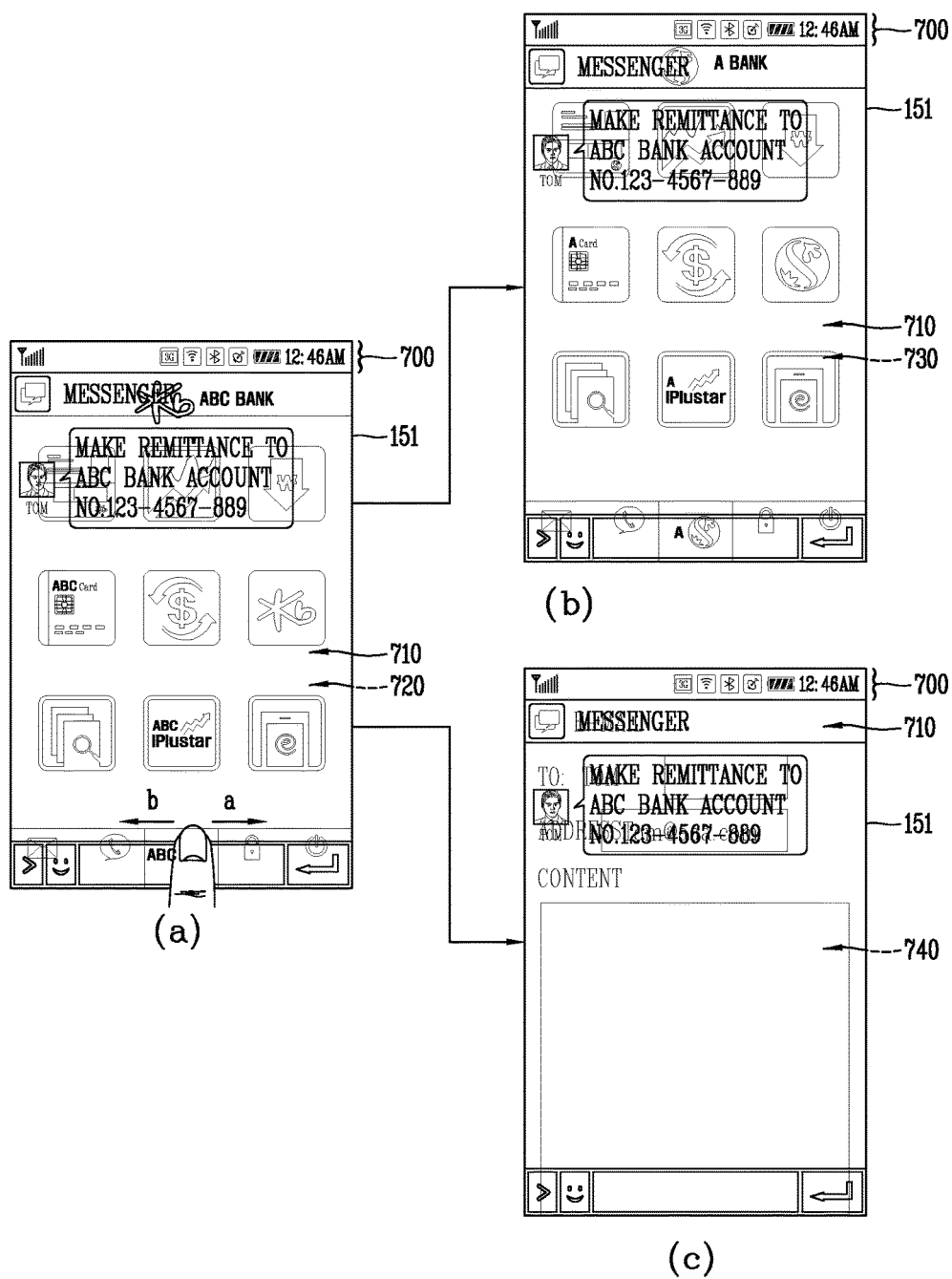

In addition, if the number of the applications associated with the "finance transaction" or the "message" is one or more, the controller 180 changes the screen information currently included in the second layer 720 to a different screen information corresponding to a predetermined-type touch with respect to the display unit as illustrated in FIG. 7C.

For example, for a touch applied to the display unit 151 in an "a" direction as illustrated in FIG. 7C(a), the controller 180 changes the screen information that is present on the second layer 730 to the execution screen of the application corresponds to a different finance transaction function as illustrated in FIG. 7C(b). In addition, for the touch applied to the display unit 151 in a "b" direction, the controller 180 changes the screen information present on a second layer 740 to the execution screen of the application associated with communication as illustrated in FIG. 7C(c).

In addition, the controller 180 notifies the user that the screen information included in the second layer can be changed to different screen information, by outputting guide information on the display unit 151. In this instance, the guide information corresponds to the graphic object, and when the touch is applied to the graphic object, the controller 180 switches the screen information displayed on the second layer to different screen the information.

Figure 8A:
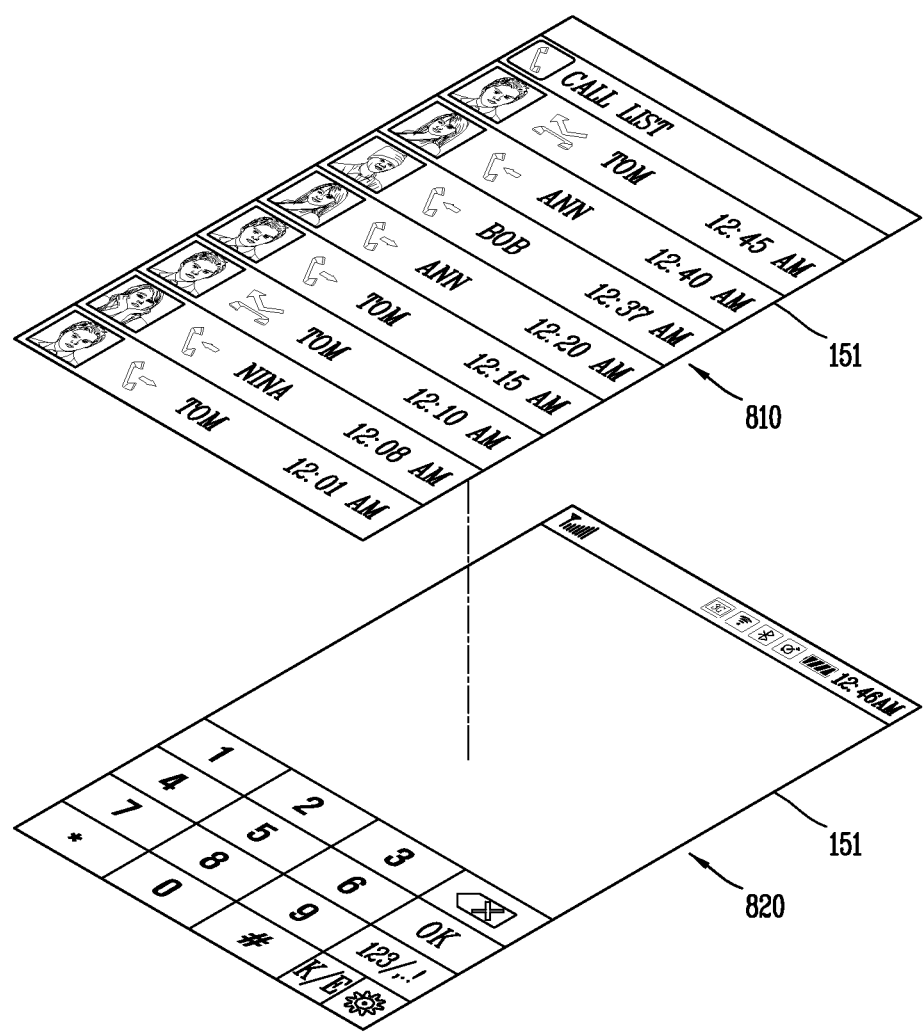

Further, the screen information that can be output on the second layer is determined depending on types of screen information included in the first layer. If call log information is included in a first layer 810 as illustrated in FIG. 8A, screen information 820 corresponding to an outgoing call function is included in a second layer 820.

Figure 8B:
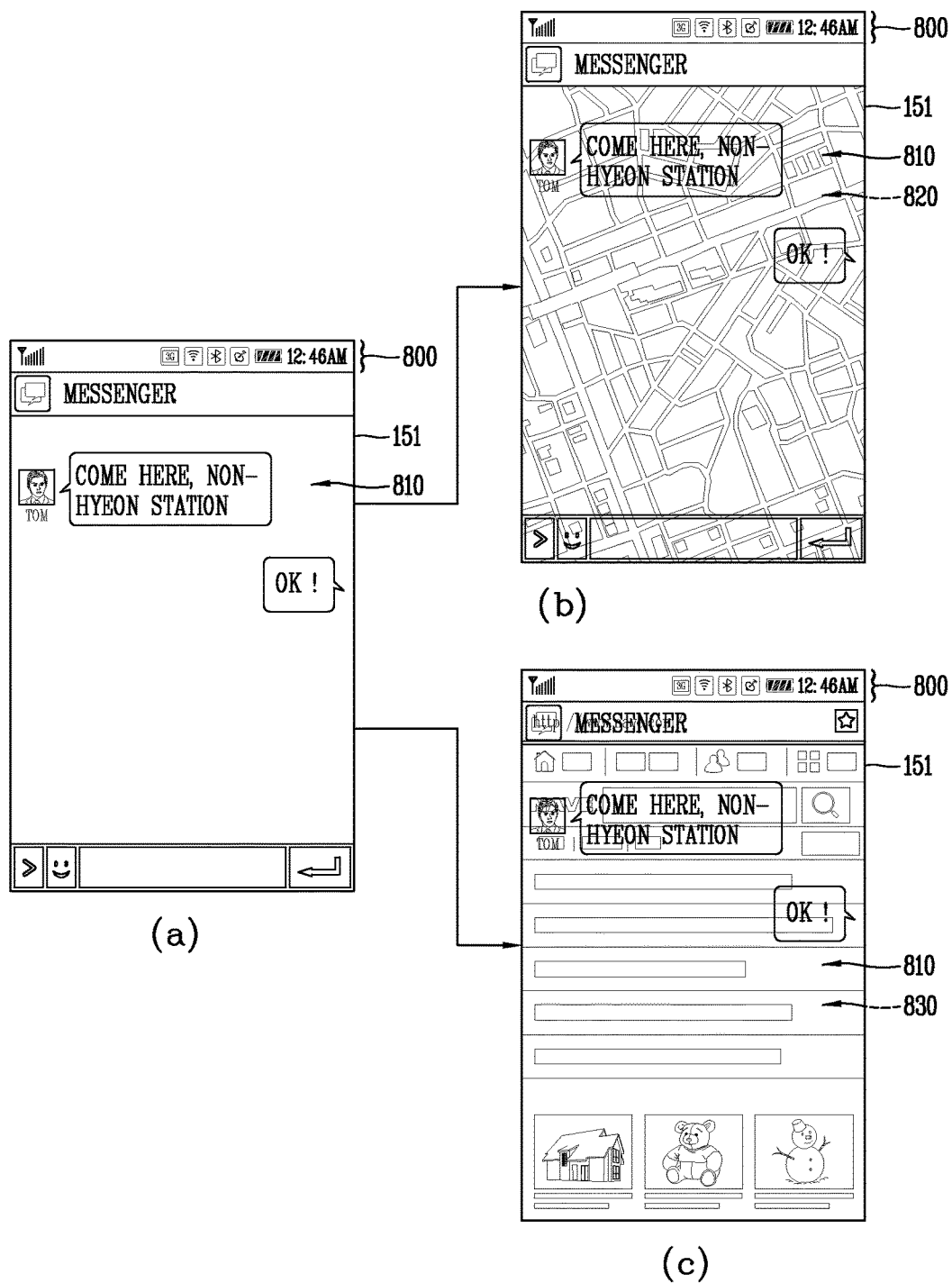

In addition, the controller 180 determines the screen information that is to be output on the second layer, according to the content of the screen information included in the first layer. For example, if the information "Non-Hyoun Station" is included in the first layer 810 as illustrated in FIG. 8B(a), the controller 180 displays the application or the information relating to "Non-Hyoun Station." For example, the map showing the vicinity of "Non-Hyoun Station" is output on the second layer 820 as illustrated in FIG. 8B(b), and a search site through which to search for the information relating to "Non-Hyoun Station" is output on the second layer 830 as illustrated in FIG. 8B(c).

As described above, in the mobile terminal according to one embodiment of the present invention, the information relating to the screen information included in the first layer is automatically output on the second layer. Therefore, the user can avoid the inconvenience of the selection of the information to be output on the second layer.

A method of utilizing the information included in the first layer is described in detail below referring to the accompanying drawings. FIG. 9 includes diagrams illustrating the method in which the information included in the first layer is utilized on the second layer in the mobile terminal according to one embodiment of the present invention.

The mobile terminal according to one embodiment of the present invention provides a user interface by which the information included in the first layer is used directly in the second layer or the information included in the second layer is used directly in the first layer. For example, if the user needs to input the information included in the first layer into an input window included in the second layer, the mobile terminal according to the present invention saves the user the trouble of inputting the information included in the first layer directly into the input window.

An embodiment in which the information included in the first layer is utilized on the second layer is described below. However, it is apparent from the following embodiment that the information included in the second layer can also be utilized in the first layer.

If the request for inputting the information into a second layer 920 occurs when a first layer 910 and the second layer 920 overlap each other as illustrated in FIGS. 9A(a) and 9A(b), (for example, if the input is applied to the input window), the controller 180 outputs a pop-up window 921 that recommends inputting the information included in the first layer 910 as illustrated in FIG. 9A(c). The controller 180 extracts the information (for example, telephone number information) included in the first layer 910 and causes the extracted information to be utilized on the second layer 920.

Therefore, when the user needs to use the telephone number information included in the first layer 910, he or she can utilize the desired telephone number by the selection through the pop-up window 921 without having to separately input the information included in the first layer 910 into the second layer 920.

Further, a method of providing the information included in the first layer 910 to the layer 920 may be changed in various ways, depending on the user interface environment. In addition, in the mobile terminal according to one embodiment of the present invention, if a region on which the information included on the first layer 910 is output is touched on, the controller 180 utilizes the information that is output on a region corresponding to the touched-on region, on the second layer 920.

Figure 9B:
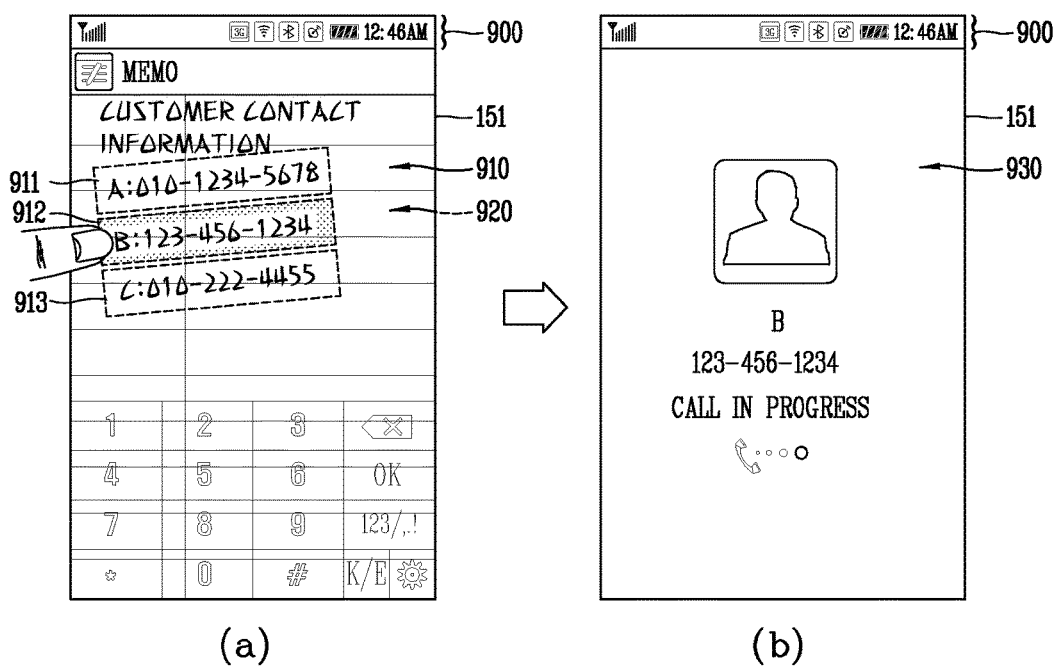
FIGS. 9A(a) to 9A(d), 9B(a) and 9B(b), and 9C(a) and 9C(b) are diagrams illustrating a method in which information included in the first layer is utilized on the second layer in the mobile terminal according to one embodiment of the present invention.

For example, when a region is selected from among a first region 911, the second region 912, and a third region 913 on which the information included on the first layer 910 is output (FIG. 9B(a)), the controller 180 places an outgoing call by utilizing the information included in the second region 912. In addition, if the input window is present in the second layer 920, the information included in the second region 912 is automatically input into the input window, based on the selection of the second region 912.

In addition, the controller 180 visually displays a region on which the information utilizable on the second layer 920, of the information included in the first layer 910 is output, to distinguish the region from different regions.

Figure 9C:
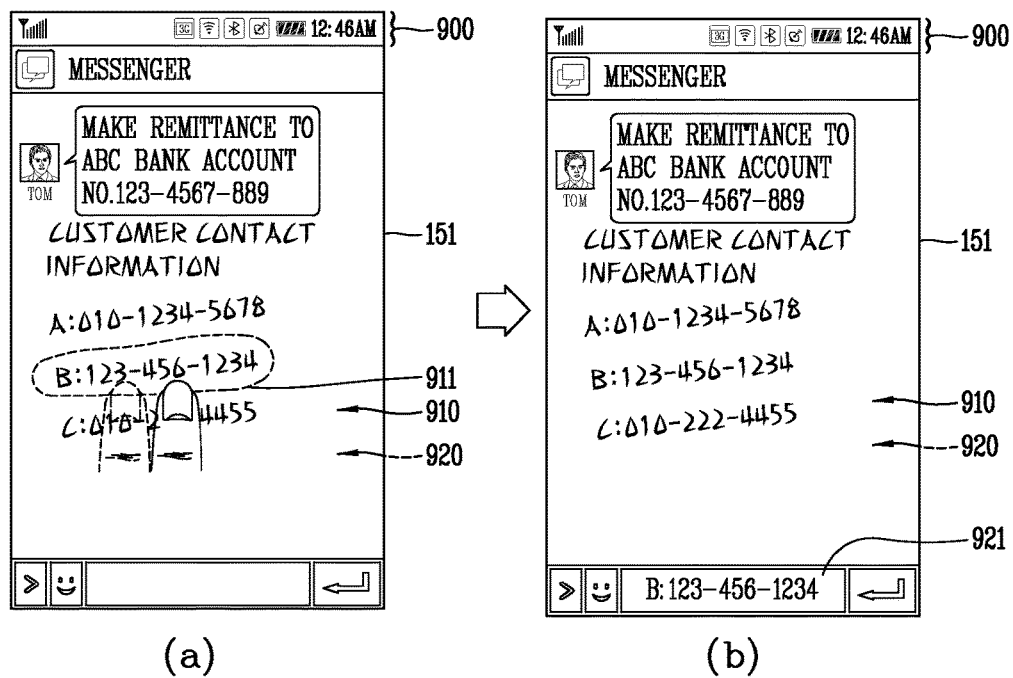

Further, as illustrated in FIG. 9C(a) and (b), the controller 180 inputs the information included in a touch trace 911 corresponding to the touch applied to the display unit, of the region on which the information included on the first layer 910 is automatically output, into the input window 921 included in the second layer 920.

A method of changing the information included in the first layer is described in detail below referring the accompanying drawings. FIG. 10 includes diagrams illustrating a method of switching the screen information that is output on the first layer in the mobile terminal according to one embodiment of the present invention.

In the mobile terminal according to one embodiment of the present invention, the screen information that is output on the first layer may be changed to different screen information. As one example, based on the predetermined-type touch that is applied to the display unit 151 as described in FIG. 10A(a), the controller 180 outputs thumbnail images 1011, 1012, and 1013 that correspond to different items of screen information that can be output in a first layer 1010, respectively, as described in FIG. 10A(b).

The information that is output on the first layer 1010 before applying the predetermined-type touch is the captured image, and the thumbnail images 1011, 1012, and 1013 that are output as illustrated above in FIG. 10A(b) also are images that are previously captured.

Figure 10A:
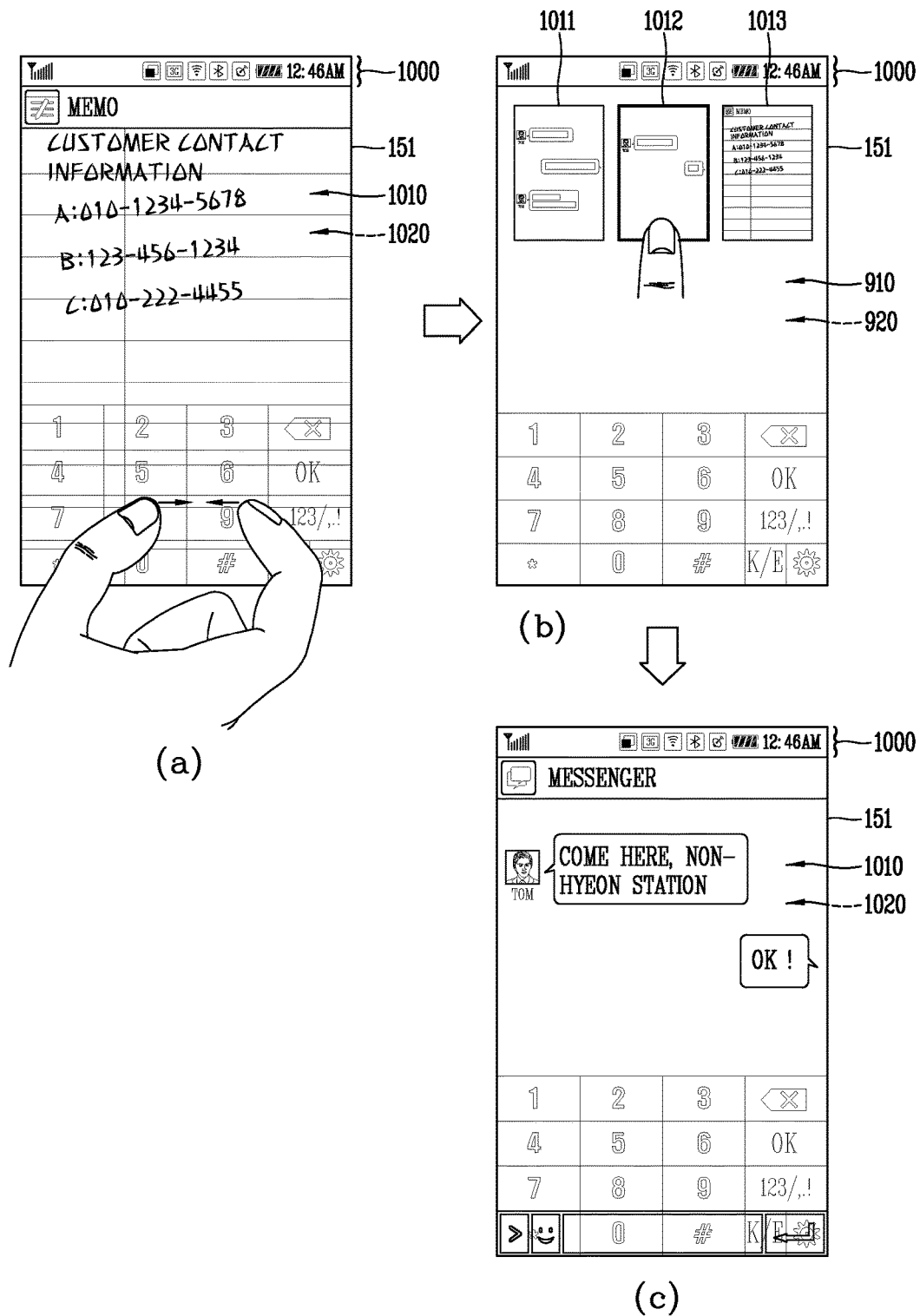
FIGS. 10A(a) to 10A(c), 10B(a) to 10B(c), and 10C(a) and 10C(b) are diagrams illustrating a method of switching the screen information that is output to the first layer in the mobile terminal according to one embodiment of the present invention.

Further, when any one of the thumbnail images 1011, 1012, 1013 is selected, the controller 180 displays the captured image corresponding to the selected thumbnail image as the screen information present on the first layer 1010 as illustrated in FIG. 10A(c).

In addition, as illustrated in FIGS. 10A(a) to 10A(c), the controller 180 switches the screen information included in the first layer 1010 even though the thumbnail images are not output. For example, corresponding to the predetermined-type touch (for example, a drag, a flick, a slide touch, or the like) with respect to the display unit 151 as illustrated in FIG. 10B(a), the screen information included in the first layer 1010 may be switched as illustrated in FIGS. 10B(b) and 10B(c).

Figure 10C:
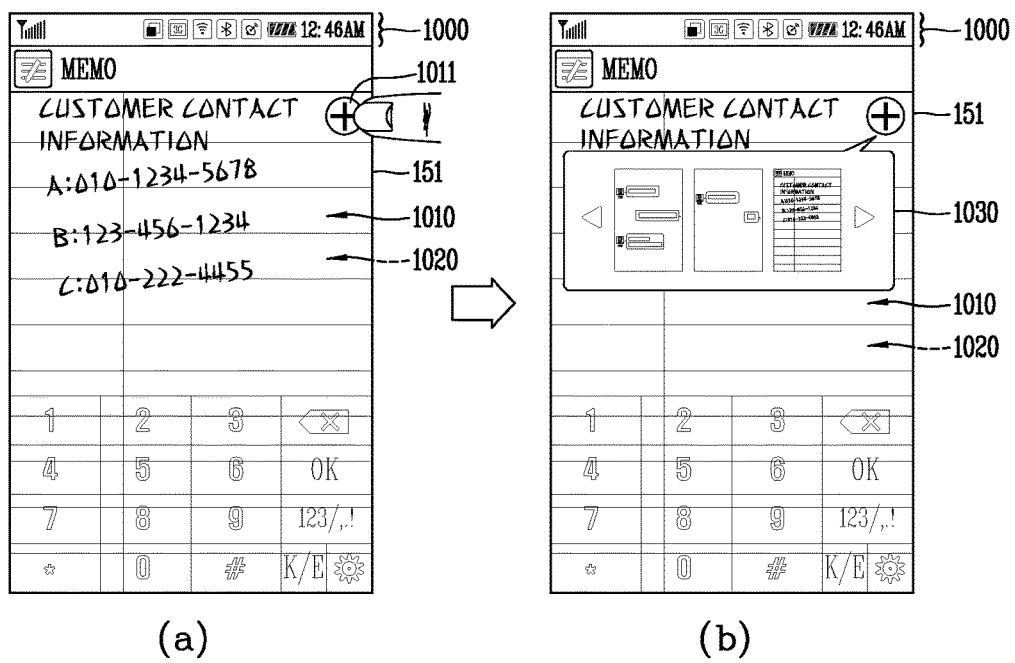

In addition, as another example, when a function icon 1011 that is output on the display unit is touched on as illustrated in FIG. 10C(a), the controller 180 outputs a pop-up window 1030 and outputs the information on the screen information that can be output on the first layer 1010 to the pop-window 1030 as illustrated in FIG. 10C(b). Further, as illustrated, the information on the screen information is output in the form of a thumbnail image and is output in the text form as well.

Further, when any one of the items of information is selected through the pop-up window, the controller 180 changes the screen information included in the first layer 1010 to the screen information corresponding to the selected item of information.

In addition, the examples illustrated in FIG. 10 may be applied only when the first layer 1010 is in a state of being able to receive the control command, that is, in the activated state. When the first layer 1010 is not in the state of being able to receive the control command, the above-described examples may be applied in the inactivated state as well. That is, if the function icon 1011 is selected or the predetermined-type touch is applied to the display unit, the controller 180 acknowledges this as a control command for changing the screen information that is present on the first layer.

A method of controlling the layer is described in detail below referring to the accompanying drawings. FIG. 11 includes diagrams illustrating the method of controlling the layer in the mobile terminal according to one embodiment of the present invention.

In the mobile terminal according to one embodiment of the present invention, the first layer or the second layer is controlled by using the graphic object or the function icon. For example, as illustrated in FIG. 11A(a), the controller 180 changes a transparency of first or second layer 1110 or 1120, corresponding to the touch with respect to a graphic object 1132 that corresponds to an adjusting bar for adjusting the transparency of the first or second layer 1110 or 1120.

Figure 11A:
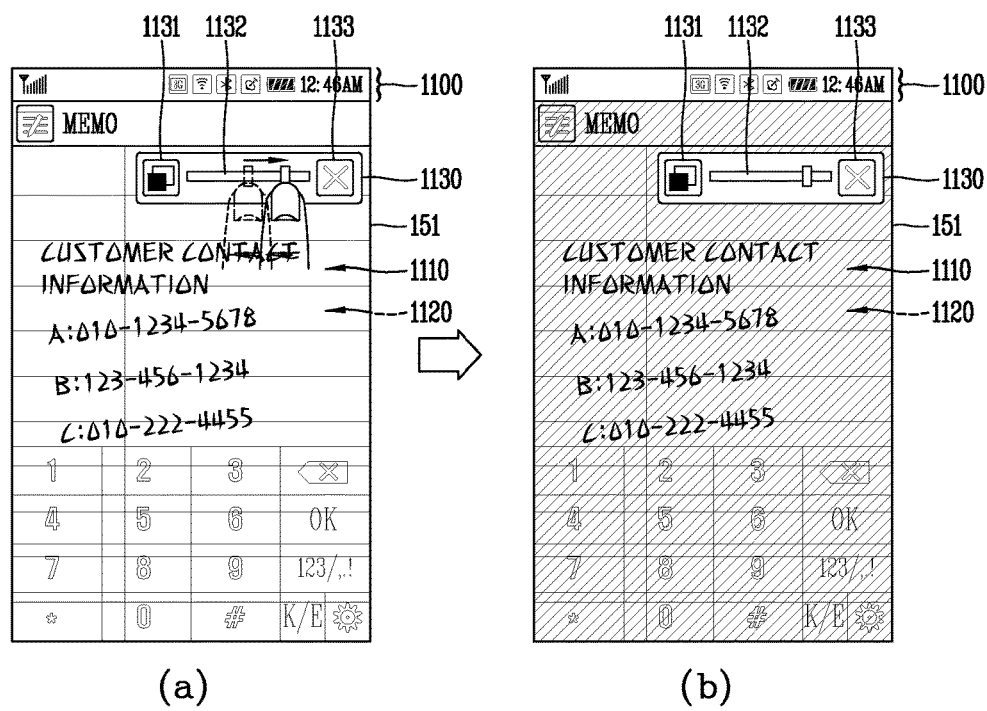
FIGS. 11A(a) and 11A(b), 11B(a) and 11B(b), and 11C(a) to 11C(c) are diagrams illustrating a method of controlling the first layer in the mobile terminal according to one embodiment of the present invention.

For example, if the transparency of the first layer 1110 decreases, the discernibleness of the screen information present on the second layer 1120 decreases as illustrated in FIG. 11A(b). Further, if the user needs to the transparency of the second layer 1120, he or she can select a switching icon 1131 and then apply the touch to the graphic object 1132 corresponding to the adjusting bar to adjust the transparency of the second layer 1120. That is, the user can select the layer to be controlled through the use of the switching icon 1131.

Figure 11B:
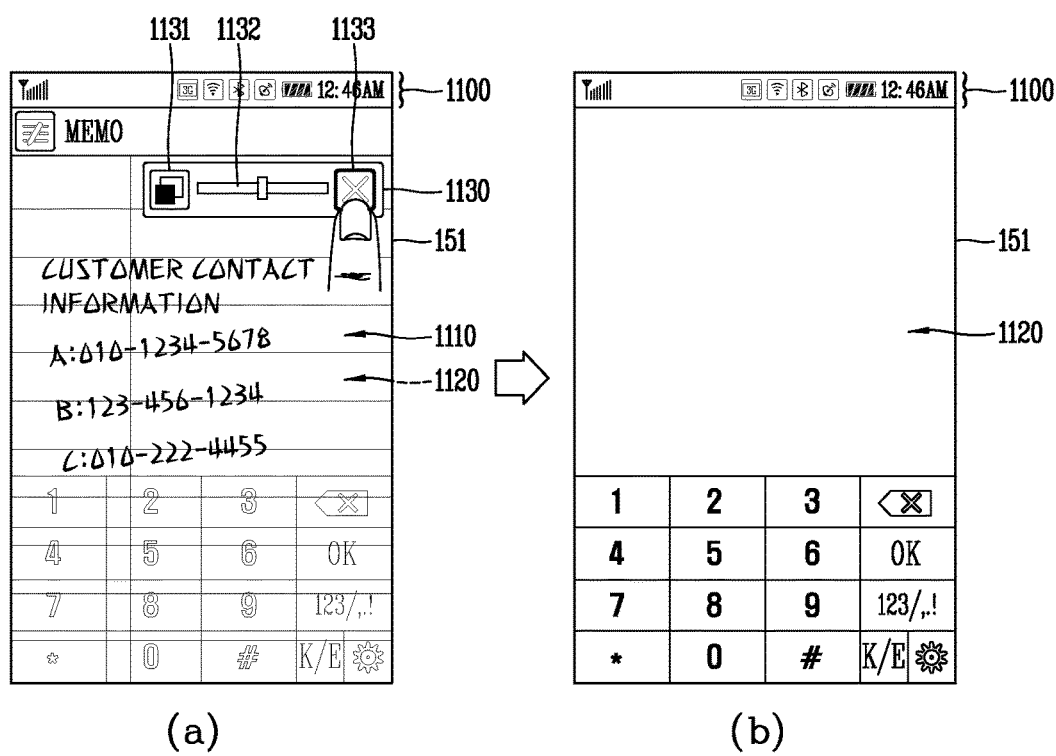

Further, as illustrated in FIG. 11B(a), the controller 180 terminates the outputting of at least one of the first and second layers 1110 and 1120, based on the touch with respect to a terminating icon 1133. Also, as described above, the user can select the layer to be terminated through the user of the switching icon 1131.

Further, a position of the graphic object or the icon illustrated in FIGS. 11A(a) and 11A(b) and FIGS. 11B(a) and 11B(b) is changed or moved based on the user's selection. In addition, in the mobile terminal according to one embodiment of the present invention, as illustrated in FIGS. 11C(a) and 11C(b), the extent to which any one of the first and second layers 1110 and 1120 is output is changed, or any one of the first and second layers 1110 and 1120 is terminated based on the multi-touch that is applied to the multiple points.

For example, the controller 180 changes the information that is displayed on the first layer 1110, based on the drag touch using the multi-touch, as illustrated in FIG. 11C(b), or terminates the outputting of the first layer 1110 as illustrated in FIG. 11C(c).

Further, the outputting of the layer is changed or terminated according to the number of touch points. For example, if the touch is applied to the two points as illustrated in FIGS. 11C(a) to 11C(c), the controller 180 changes or terminates the outputting of the first layer 1110. Then, if the touch is applied to the three points, the controller 180 changes or terminates the second layer 1120.

A method of storing the screen information included in the layer is described in detail below referring to the accompanying drawings. FIG. 12 includes diagrams illustrating the method of storing the screen information included in at least one of the first and second layers in the mobile terminal according to one embodiment of the present invention.

In the mobile terminal according to one embodiment of the present invention, at least one part of each of the items of screen information included in the first layer and the second layer is stored based on the user's selection. For example, as illustrated in FIG. 12A(a), a function icon 1211 for storing the screen information is output on the display unit 151.

Figure 12A:
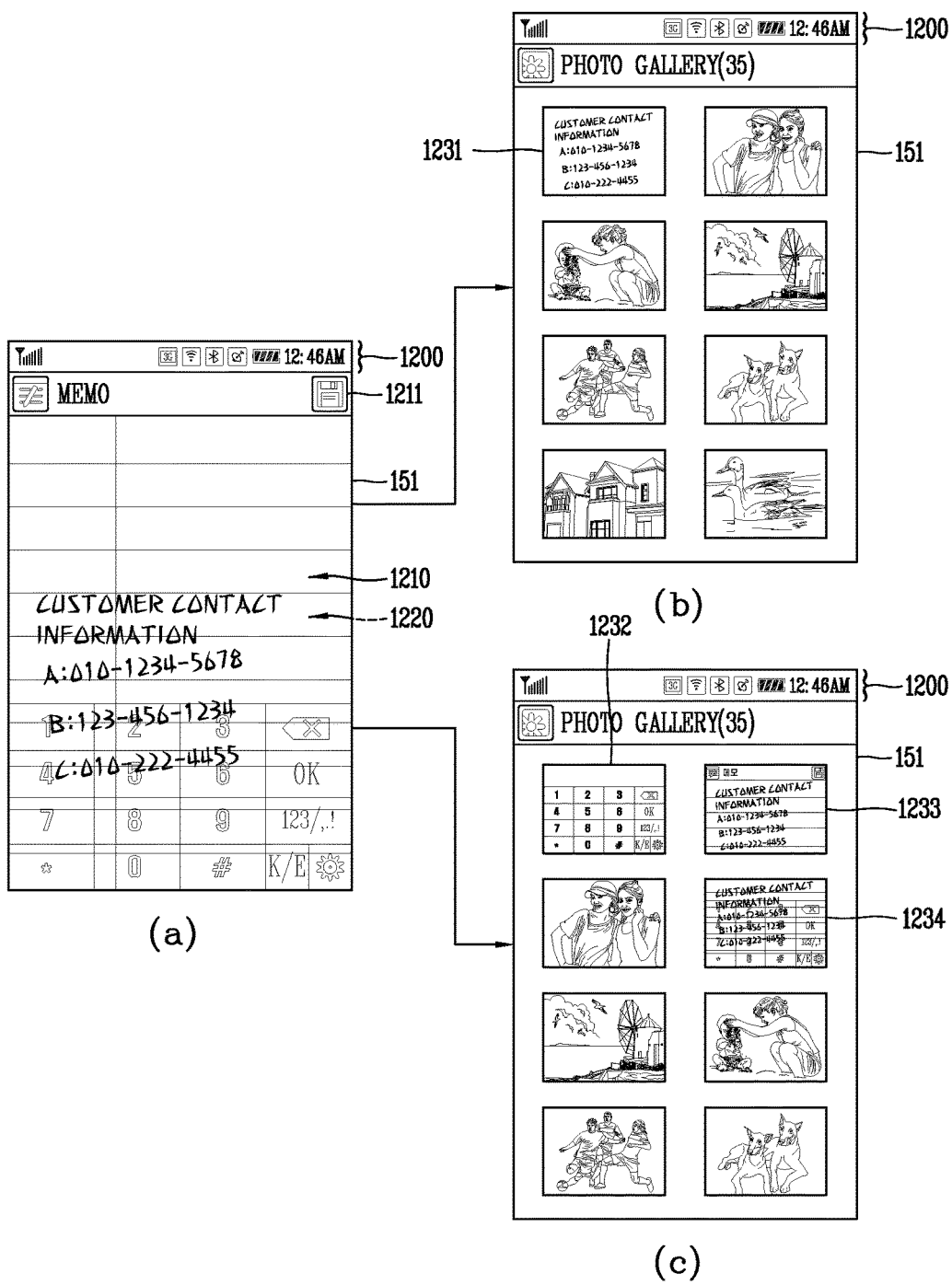
FIGS. 12A(a) to 12A(c), 12B, and 12C(a) to 12C(b) are diagrams illustrating a method of storing the screen information included in at least one of the first and second layers in the mobile terminal according to one embodiment of the present invention.

Further, if the function icon 1211 is selected, the controller 180 stores any one of a first layer 1210 and a second layer 1220 in an image format as illustrated in FIG. 12A(b) (refer to 1231). In addition, as illustrated in FIG. 12A(c), the controller 180 separately stores the first layer 1210 and the second layer 1220 in the image format and further stores an image 1234 as is, which results from the overlapping first and second layers 1210 and 1220.

Figure 12B:
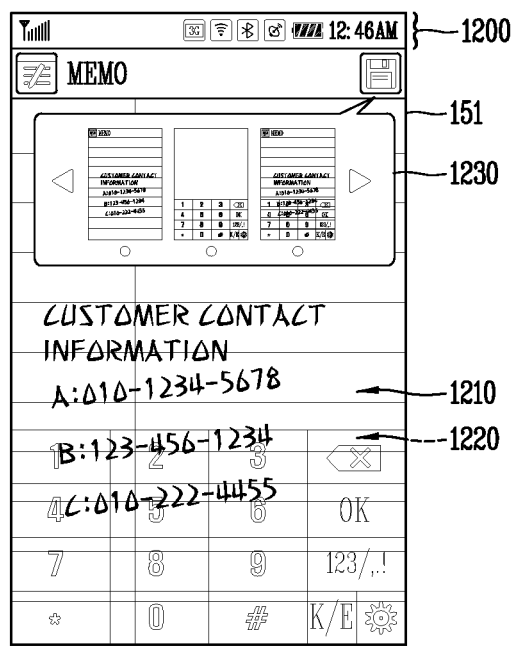

In addition, the controller 180 determines whether at least one of the first layer 1210 and the second layer 1220 is stored, or the image itself resulting from the overlapping first and second layers 1210 and 1220 is stored, or all of them are stored, based on the user's selection. For example, when receiving a control command for storing the screen information included in the layer, as illustrated in FIG. 12B, the controller 180 outputs a pop-up window 1230 on one part of the display unit 151, and if the user selects which layer the screen information to be stored is included in, then stores the screen information, based on the user's selection.

Further, if the information included in the layer is stored, the information is not necessarily stored in the image format. It is possible to extract text-based content from the screen information and store the text-based content in the electronic document format. In addition, it is apparent that the information included in the screen information can be stored in the various formats, depending on a property of the information.

Further, if at least one of the first and second layers is stored, the controller 180 may store original types of items of screen information included in the first and second layers, respectively, as are. For example, when receiving the control command for storing the screen information included in the first layer, if the first layer has such transparency that the information included in the second layer is discernible, the controller 180 stores the screen information included in the first layer so the screen information has the transparency.

Figure 12C:
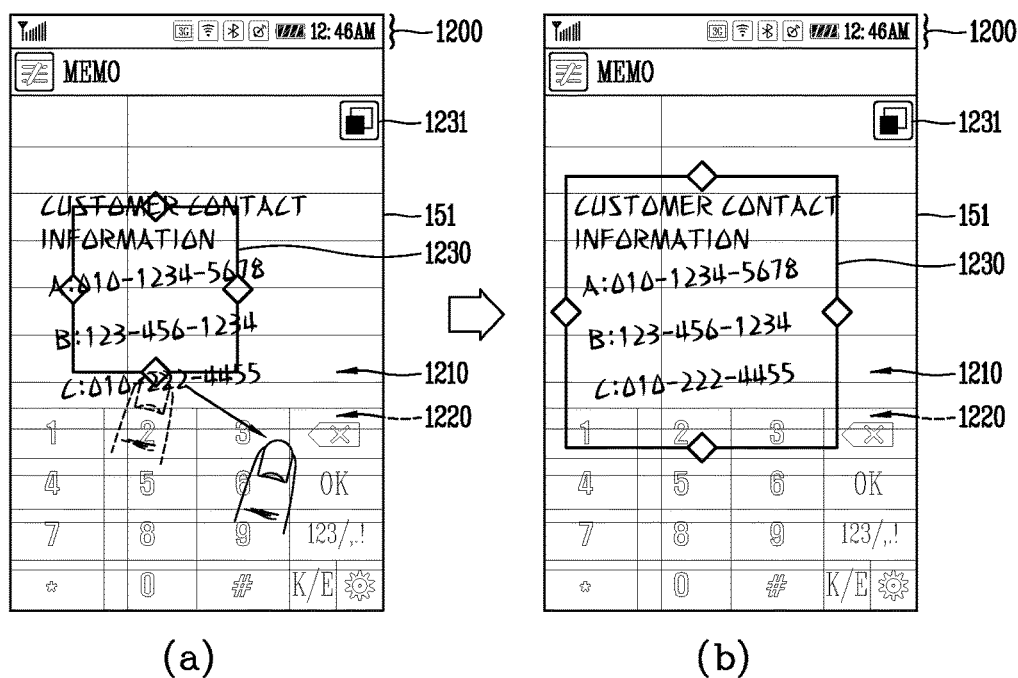

In addition, as illustrated in FIGS. 12C(a) and 12C(b), the user provides setting a region 1230 in which the screen information is stored. The controller 180 changes a size of a guide region 1230 according to the extent to which the touch (for example, the drag touch) is applied to the guide region 1230. The controller 180 stores information included in the guide region 1230.

In addition, the controller 180 stores the screen information corresponding to the guide region 1230 in the image format. Alternatively, the controller 180 extracts the information included in the guide region 1230 and stores the screen information corresponding to the guide region 1230 in the format suitable for the extracted information. For example, if the extracted information is text-based, the extracted information is stored in a word processor file format.

Further, based on the touch applied to a switching icon 1231, the user selects which one of the first and second layers the screen information to be stored is included in or selects whether the items of screen information included in the first and second layers are stored as one image. That is, the visual exterior appearance of the switching icon 1231 is changed depending on which one of the first and second layers the screen information to be stored is set as being included in.

For example, the visual exterior appearance of the switching icon 1231 in FIGS. 12C(a) and 12C(b) when the screen information included in the first layer is set as being stored. A status area 1200 is also displayed on an upper portion of the mobile terminal.

As described above, in the mobile terminal according to the one embodiment of the present invention, although the first and second layers overlap each other, the screen information is selectively stored whenever necessary, and this increases user convenience.

Figure 13A:
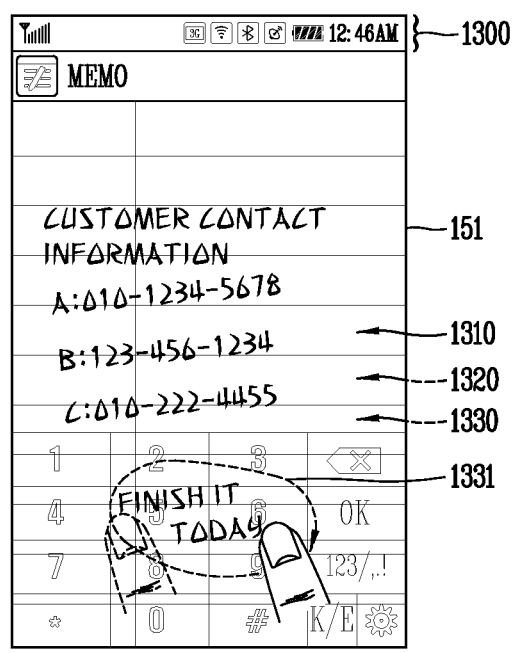
FIGS. 13A, 13B, and 13C(a) and 13C(b) are diagrams illustrating a method of providing a memo function in the mobile terminal according to one embodiment of the present invention.

A method of providing a memo function is described in detail below referring to the accompanying drawings. FIG. 13 includes diagrams illustrating the method of providing the memo function in the mobile terminal according to one embodiment of the present invention.

In the mobile terminal according to one embodiment of the present invention, based on the user's request, a third layer 1330 is output for displaying the memo corresponding to the trace of the touch with respect to the display unit or the memo using the touch with respect to a virtual keyboard also when first and second layers 1310 and 1320 overlap each other. The third layer 1330 overlaps at least one part of the first and second layers 1310 and 1320, and the information corresponding to at least one part that overlaps, of the items of screen information included in the first and second layers 1310 and 1320, is configured in such a manner to be discernible.

Figure 13B:
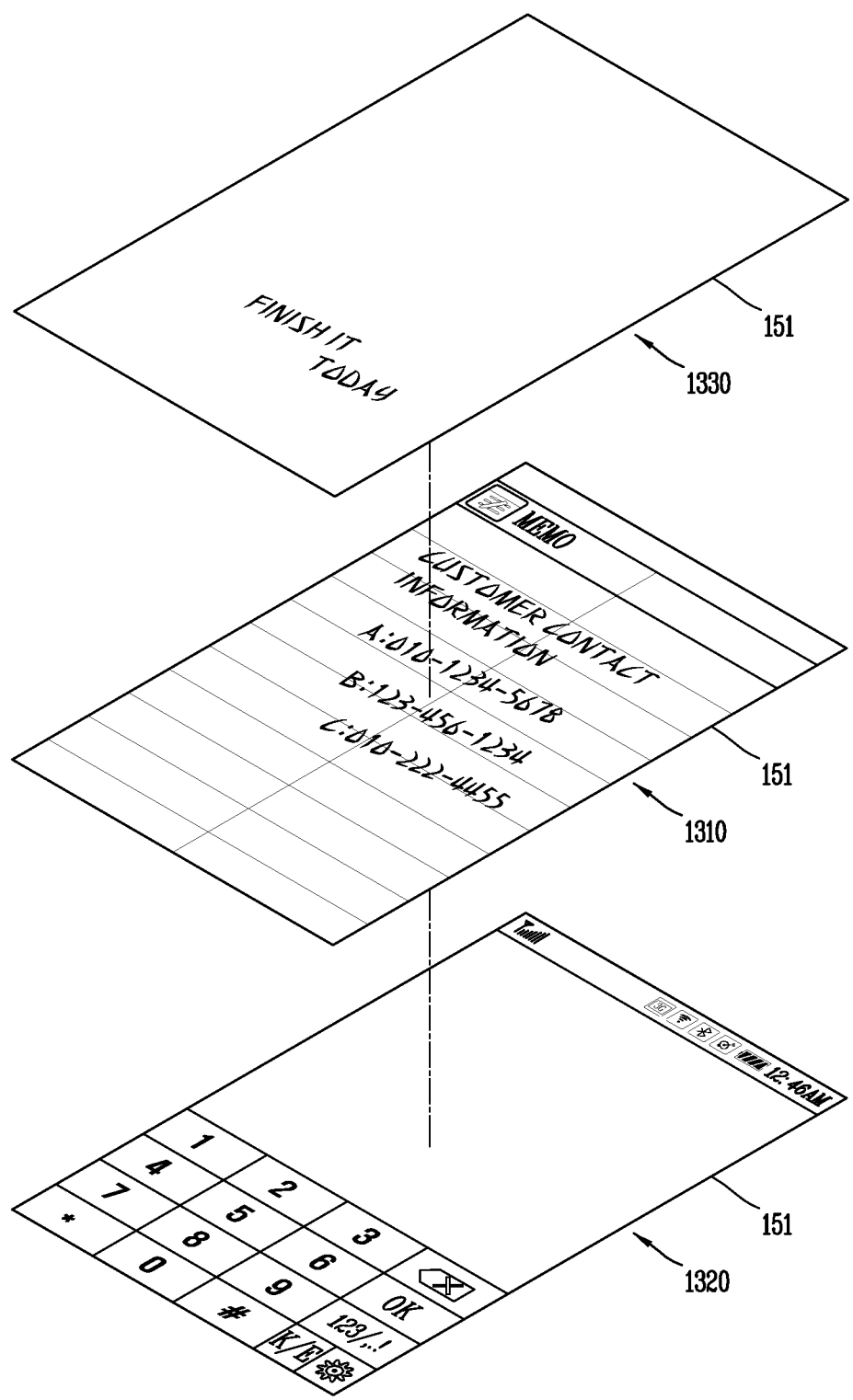
Figure 13C:
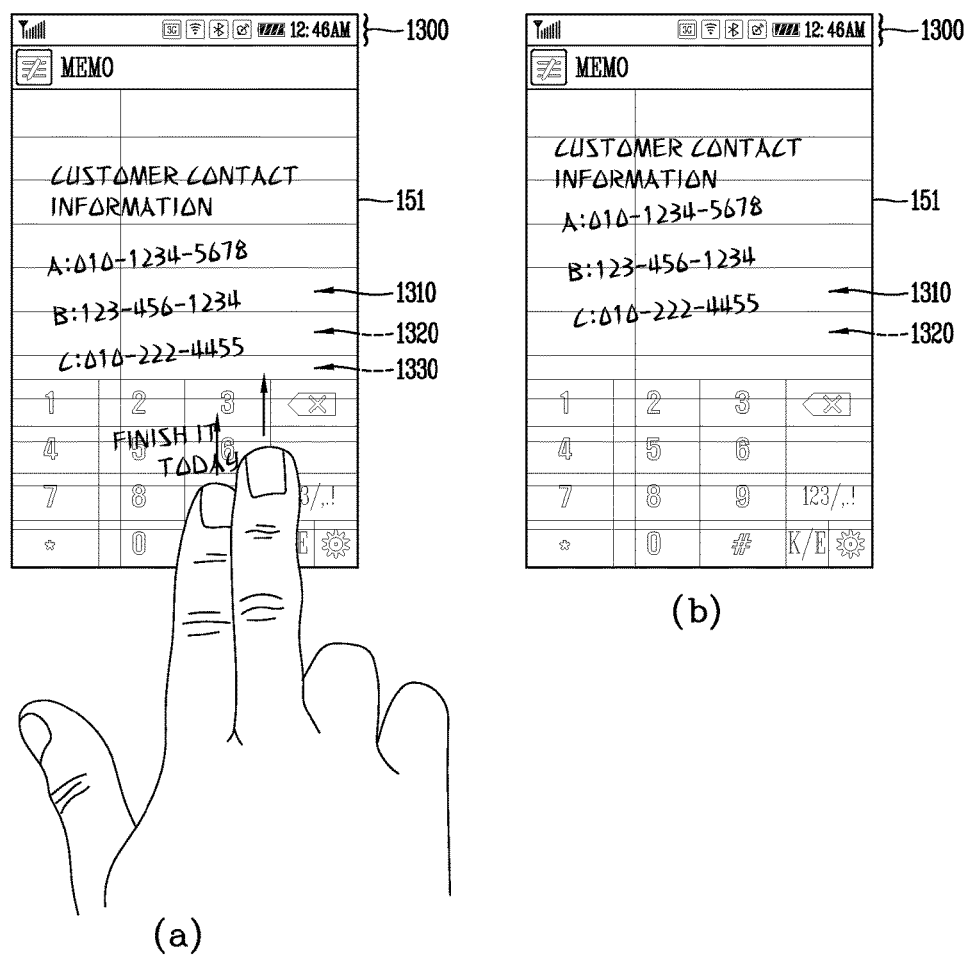

The first, second, and third layers 1310, 1320, and 1330 are of hierarchical structure as illustrated in FIG. 13B and the three layers are output on one display region at the same time to overlap one another. Further, if the first, second, and third layer 1310, 1320, and 1330 overlap one another, a relationship in vertical position between the layers may be changed in various ways.

In addition, the outputting of at least one of the first, second, and third layers is terminated based on the predetermined-type touch with respect to the display unit or on the touch with respect to the function icon. The function icon or the graphic object illustrated above in FIGS. 11A and 11B are utilized in the same manner also when the third layer 1330 for the memo function overlaps.

In addition, when the third layer 1330 is output, an outputting state of at least one of the first, second, and third layers 1310, 1320, and 1330 may be changed based on the multi-touch as illustrated in FIGS. 11C(a) to 11C(c). The controller 180 determines which of the first, second, third layers 1310, 1320, and 1330 is a layer whose outputting state is changed, according to the number of touch points to which the multi-touch is applied.

In addition, it is apparent from FIGS. 12A-12C that the embodiment in which the screen information included in the layer may be applied in the same manner when the third layer overlaps. Further, the controller 180 may separately output at least one function icon for storing or sharing the content of the memo with respect to the third layer on the display unit 151. Therefore, the user can separately store, transmit, or share only the content of the memo.

In addition, the two overlapping layers are described above as examples according to the embodiments, but the present invention is not limited to this configuration and three or more overlapping layers may be possible.

As described above, in the mobile terminal according to one embodiment of the present invention and the method of controlling the mobile terminal, the first and second layers are controlled so the first layer in which the currently-output screen information is included and the second layer in which the different screen information is included are caused to overlap each other and the items of screen information included in the first and second layers are discernible to the user. Therefore, the user can use the screen information included in the second layer while at the same time using the screen information included in the first layer. Furthermore, if the items of screen information included in the first and second layers are associated with each other, the user can use the items of information that are associated with each other, more conveniently on one display screen.

In addition, in the mobile terminal according to one embodiment of the present invention and the method of controlling the mobile terminal, the information relating to the screen information included in the first layer is provided to the second layer. Therefore, it is possible to shorten the time it takes to search for the information or the application associated with the screen information included in the first layer.

Further, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
    a wireless communication unit configured to perform wireless communication;
    a touch screen configured to display first screen information of a first application; and a controller configured to:
analyze contents of the first screen information of the first application in response to a predetermined input for causing the first screen information and another screen information to overlap each other, wherein the controller captures an image of the first screen information of the first application based on the predetermined input, wherein one or more applications related to the contents of the first screen information of the first application is suggested based on the analysis,
display one or more icons each corresponding to the suggested one or more applications on an adjacent region to a region including information that has the closest relation to the suggested one or more applications, wherein the suggested one or more applications is related to the contents of the first screen information and a type of the one or more applications is determined according to the analyzed contents of the first screen information, and
display, on the touch screen, a second screen information of a second application different from the first application when an icon corresponding to the second application is selected among the one or more icons, wherein the second screen information of the second application is overlapped with the captured image of the first screen information in response to the selection of the icon, and, wherein the captured image of the first screen information has a transparency such that the second screen information of the second application is visible while the captured image of the first screen information is overlapped with the second screen information,
sense a drag-touch input applied to the touch screen while the second screen information of the second application is overlapped with the captured image of the first screen information, and
control, in response to the drag-touch input, the touch screen to switch the second screen information of the second application into a third screen information of a third application, wherein the third screen information of the third application is overlapped with the captured image of the first screen information,
wherein the captured image of the first screen information has a transparency while the second screen information is switched into the third screen information of the third application, and
wherein the third application is one of the suggested one or more applications.

2. The mobile terminal of claim 1, wherein the captured image of the first screen information is displayed at least partially overlapping the second screen information of the second application.

3. The mobile terminal of claim 2, wherein the captured image of the first screen information covers the second screen information of the second application, and the captured image of the first screen information is transparent so the first and second screen information can been seen at the same time.

4. The mobile terminal of claim 1, wherein the one or more icons each corresponding to the one or more applications includes any one of a) a map icon for displaying a map related to the analyzed first screen information of the first application, b) a schedule icon for scheduling an event related to the analyzed first screen information of the first application, and c) a search icon for searching additional information related to the analyzed contents of the first screen information of the first application.

5. The mobile terminal of claim 1, wherein the second screen information of the second application includes an outgoing call function when the analyzed contents of the first screen information of the first application includes call log information.

6. The mobile terminal of claim 1, wherein the second screen information of the second application includes at least one of a map function and a search function when the analyzed contents of the first screen information of the first application includes location information.

7. The mobile terminal of claim 1, wherein the controller is further configured to store at least one of the first screen information of the first application and the second screen information of the second application separately in an image format based on a user's selection, or store the overlapping first and second screen information in the image format.

8. The mobile terminal of claim 1, wherein the controller is further configured to:
display multiple image objects including different first screen information that may be displayed on the first screen information of the first application based on a user's request for changing the first screen information that is displayed on the first screen information of the first application, and
switch displaying the first screen information of the first application to the different first screen information based on selection of a corresponding image object.

9. A method of controlling a mobile terminal, the method comprising:
displaying, on a touch screen of the mobile terminal, a first screen information of a first application;
analyzing contents of the first screen information of the first application in response to a predetermined input for causing the first screen information and another screen information to overlap each other, wherein an image of the first screen information of the first application is captured based on the predetermined input, wherein one or more applications related to the contents of the first screen information of the first application is suggested based on the analysis;
displaying, on the touch screen, one or more icons each corresponding to the suggested one or more applications on an adjacent region to a region including information that has the closest relation to suggested the one or more applications, wherein the suggested one or more applications is related to the contents of the first screen information and a type of the one or more applications is determined according to the analyzed contents of the first screen information;
displaying, on the touch screen, a second screen information of a second application different from the first application when an icon corresponding to the second application is selected among the one or more icons, wherein the second screen information of the second application is overlapped with the captured image of the first screen information in response to the selection of the icon, and wherein the captured image of the first screen information has a transparency such that the second screen information of the second application is visible while the captured image of the first screen information is overlapped with the second screen information;
sensing a drag-touch input applied to the touch screen while the second screen information of the second application is overlapped with the captured image of the first screen information; and controlling, in response to the drag-touch input, the touch screen to switch the second screen information of the second application into a third screen information of a third application, wherein the third screen information of the third application is overlapped with the captured image of the first screen information, wherein the captured image of the first screen information has a transparency while the second screen information is switched into the third screen information of the third application, wherein the third application is one of the suggested one or more applications.

10. The method of claim 9, wherein the captured image of the first screen information is displayed at least partially overlapping the second screen information of the second application.

* * * * *